US012609738B2

(12) United States Patent
Yuan et al.

(10) Patent No.: US 12,609,738 B2
(45) Date of Patent: Apr. 21, 2026

(54) FREQUENCY SELECTIVE PRECODER INDICATION

(71) Applicant: QUALCOMM Incorporated, San Diego, CA (US)

(72) Inventors: Fang Yuan, Beijing (CN); Wooseok Nam, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 560 days.

(21) Appl. No.: 17/788,466

(22) PCT Filed: Jan. 30, 2020

(86) PCT No.: PCT/CN2020/074073
§ 371 (c)(1),
(2) Date: Jun. 23, 2022

(87) PCT Pub. No.: WO2021/151231
PCT Pub. Date: Aug. 5, 2021

(65) Prior Publication Data
US 2023/0040860 A1     Feb. 9, 2023

(51) Int. Cl.
*H04W 72/23* (2023.01)
*H04B 7/0456* (2017.01)
(Continued)

(52) U.S. Cl.
CPC ......... *H04B 7/0456* (2013.01); *H04L 5/0094* (2013.01)

(58) Field of Classification Search
CPC ... H04B 7/0456; H04B 7/0478; H04L 5/0094; H04L 25/03343
See application file for complete search history.

(56) References Cited

U.S. PATENT DOCUMENTS 10,305,558 B2 * 5/2019 Zhang ................. H04B 7/0617
2016/0142117 A1 * 5/2016 Rahman ............... H04B 7/0486
375/267
(Continued)

FOREIGN PATENT DOCUMENTS

CN     107078773 A     8/2017
CN     107925454 A     4/2018
(Continued)

OTHER PUBLICATIONS

3GPP TSG-RAN WG1#86bis, R1-1609520 Title: Discussion on UL Subband Precoding (Year: 2016).*
(Continued)

*Primary Examiner* — Faruk Hamza
*Assistant Examiner* — Abusayeed M Haque
(74) *Attorney, Agent, or Firm* — QUALCOMM Incorporated

(57) ABSTRACT

Wireless communications systems and methods related to wireless communications in a system are provided. A user equipment (UE) may receive from a base station (BS), an uplink (UL) scheduling grant indicating subband precoding information and a resource allocation spanning a plurality of subbands. The UE may determine a plurality of subband precoders based on the subband precoding information. Each precoder of the plurality of subband precoders may be associated with a subband of the plurality of subbands. The
(Continued)

UE may transmit to the BS, an UL communication signal in the resource allocation using the plurality of subband precoders.

35 Claims, 14 Drawing Sheets

(51) Int. Cl.
    *H04L 5/00*           (2006.01)
    *H04L 25/03*        (2006.01)

(56)          References Cited

U.S. PATENT DOCUMENTS

| | | | |
|---|---|---|---|
| 2016/0329945 A1* | 11/2016 | Onggosanusi | H04B 7/0478 |
| 2017/0311296 A1 | 10/2017 | Onggosanusi et al. | |
| 2019/0280751 A1 | 9/2019 | Tsai et al. | |
| 2020/0007375 A1* | 1/2020 | Zhang | H04L 25/0226 |
| 2022/0006496 A1* | 1/2022 | Park | H04W 72/23 |

FOREIGN PATENT DOCUMENTS

| | | |
|---|---|---|
| CN | 108282207 A | 7/2018 |
| CN | 110582980 A | 12/2019 |
| WO | 2017181345 A1 | 10/2017 |
| WO | 2019020050 A1 | 1/2019 |

OTHER PUBLICATIONS

VIVO: "Further Discussion on Type II CSI Compression and Feedback for High Rank Extension", 3GPP TSG RAN WG1#96bis, R1-1904095, Xi'an, China, Apr. 8-12, 2019, Mar. 30, 2019, 6 pages.

Fraunhofer Iis, et al., "Enhancements on Type-II CSI Reporting", 3GPP TSG-RAN WG1 #95, R1-1813130, 3rd Generation Partnership Project, Mobile Competence Centre, 650, Route Des Lucioles, F-06921 Sophia-Antipolis Cedex, France, vol. RAN WG1, No. Spokane, USA, Nov. 12, 2018-Nov. 16, 2018, Nov. 11, 2018, 6 Pages, XP051555112, section 2.1.

Huawei, et al., "Details of CSI Reporting on PUCCH/PUSCH", 3GPP TSG RAN WG1 Meeting NR#3, R1-1715466, 3rd Generation Partnership Project, Mobile Competence Centre, 650, Route Des Lucioles, F-06921 Sophia-Antipolis Cedex, France, vol. RAN WG1, No. Nagoya, Japan, Sep. 18, 2017-Sep. 21, 2017, Sep. 17, 2017, 9 Pages, XP051338934, section 2, the whole document.

Supplementary European Search Report—EP20916411—Search Authority—Munich—Jan. 18, 2024.

Huawei, et al., "Codebook Based Transmission for UL MIMO," 3GPP TSG RAN WG1 Meeting #89, R1-1708130, May 15-19, 2017 (May 19, 2017) sections 1-6, 9 pages.

Huawei, et al., "Codebook Based Transmission for UL MIMO," 3GPP TSG RAN WG1 Meeting #89, R1-1709206, May 15-19, 2017 (May 19, 2017) sections 1-5, 10 pages.

International Search Report and Written Opinion—PCT/CN2020/074073—ISA/EPO—Oct. 27, 2020.

Supplementary Partial European Search Report—EP20916411—Search Authority—Munich—Sep. 1, 2023.

VIVO: "Discussion on CSI Enhancement for MU-MIMO Support", 3GPP TSG RAN WG1 Meeting #94bis, R1-1812322, 3rd Generation Partnership Project, Mobile Competence Centre, 650, Route Des Lucioles, F-06921 Sophia-Antipolis Cedex, France, vol. RAN WG1, No. Spoken, USA, Nov. 12, 2018-Nov. 16, 2018, Nov. 11, 2018, XP051554227, 3 Pages.

3GPP: "3rd Generation Partnership Project, Technical Specification Group Radio Access Network, NR, Physical Layer Procedures for Data (Release 16)", 3GPP TS 38.214 V16.0.0, Dec. 2019, pp. 1-147, p. 103.

* cited by examiner

500

600

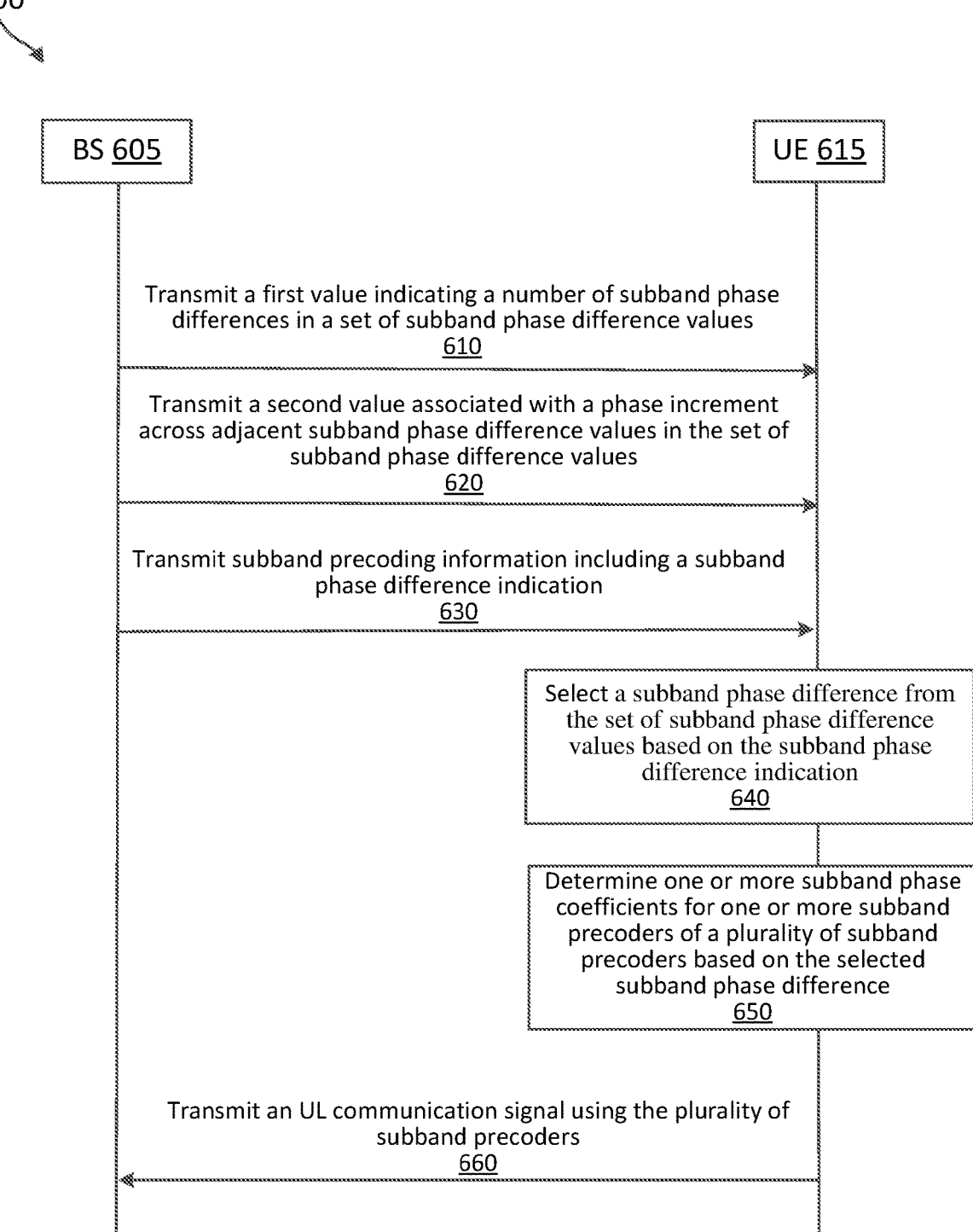

BS 605

UE 615

Transmit a first value indicating a number of subband phase differences in a set of subband phase difference values
610

Transmit a second value associated with a phase increment across adjacent subband phase difference values in the set of subband phase difference values
620

Transmit subband precoding information including a subband phase difference indication
630

Select a subband phase difference from the set of subband phase difference values based on the subband phase difference indication
640

Determine one or more subband phase coefficients for one or more subband precoders of a plurality of subband precoders based on the selected subband phase difference
650

Transmit an UL communication signal using the plurality of subband precoders
660

| Index | Codeword (m1, m2) |
|-------|-------------------|
| [0]   | (0, 1)            |
| [1]   | (1, M)            |

***

800

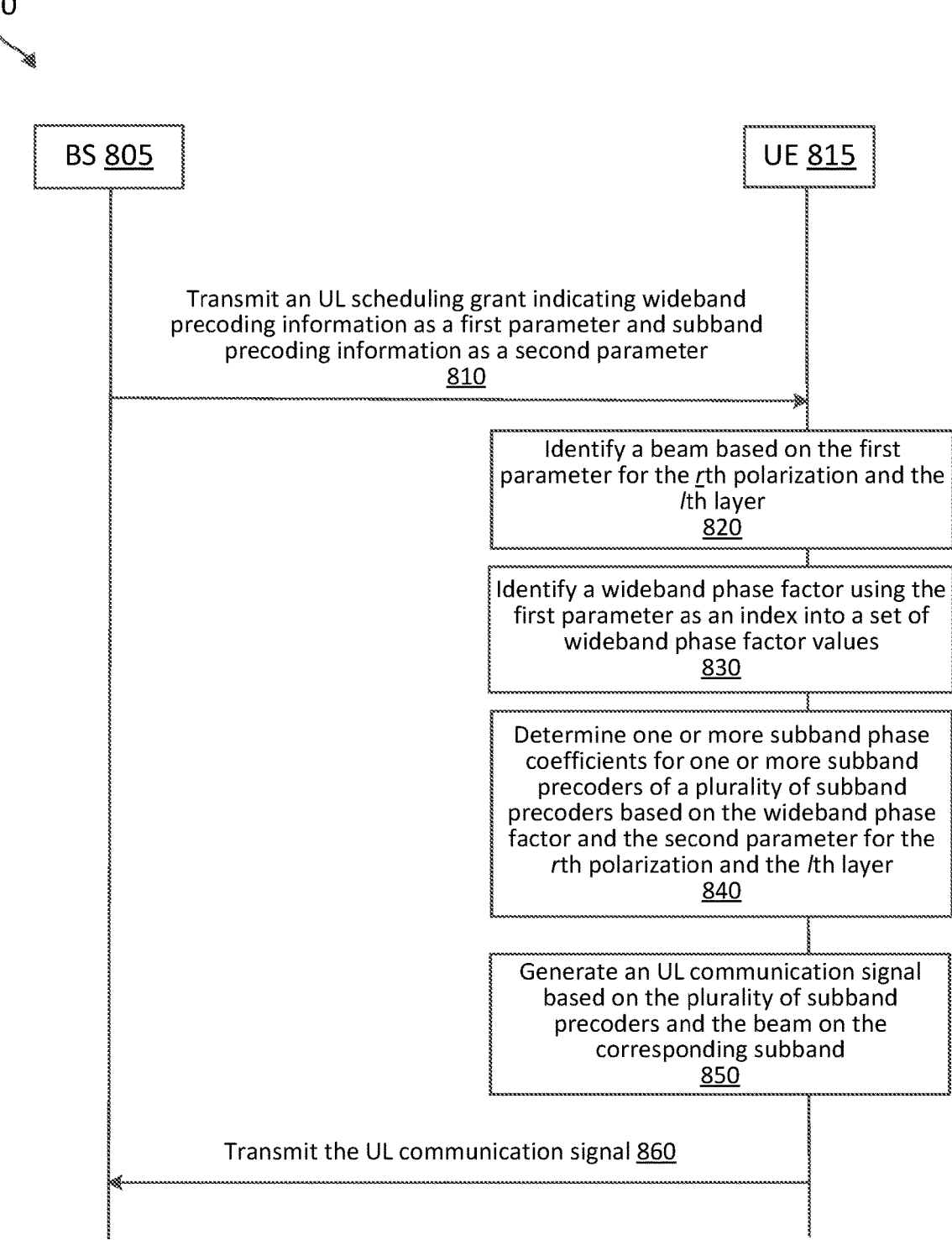

BS 805

UE 815

Transmit an UL scheduling grant indicating wideband
precoding information as a first parameter and subband
precoding information as a second parameter
810

Identify a beam based on the first
parameter for the $r$th polarization and the
$l$th layer
820

Identify a wideband phase factor using the
first parameter as an index into a set of
wideband phase factor values
830

Determine one or more subband phase
coefficients for one or more subband
precoders of a plurality of subband
precoders based on the wideband phase
factor and the second parameter for the
$r$th polarization and the $l$th layer
840

Generate an UL communication signal
based on the plurality of subband
precoders and the beam on the
corresponding subband
850

Transmit the UL communication signal 860

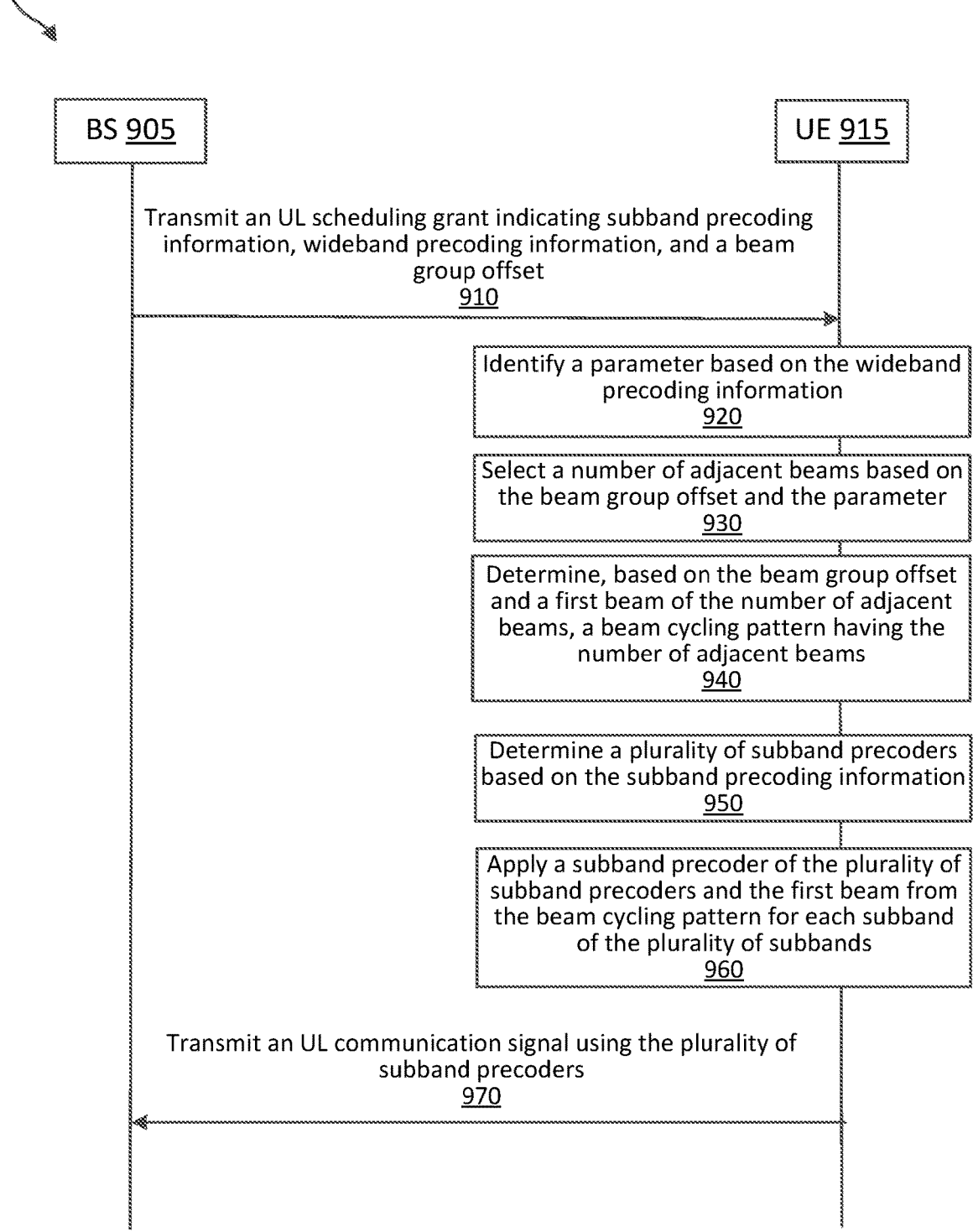

Transmit an UL scheduling grant indicating subband precoding information, wideband precoding information, and a beam group offset
910

Identify a parameter based on the wideband precoding information
920

Select a number of adjacent beams based on the beam group offset and the parameter
930

Determine, based on the beam group offset and a first beam of the number of adjacent beams, a beam cycling pattern having the number of adjacent beams
940

Determine a plurality of subband precoders based on the subband precoding information
950

Apply a subband precoder of the plurality of subband precoders and the first beam from the beam cycling pattern for each subband of the plurality of subbands
960

Transmit an UL communication signal using the plurality of subband precoders
970

Frequency

PUSCH
1202

PUSCH
1204

PUSCH
1206

PUSCH
1208

$p_1=0$     $p_1=1$     $p_1=2$     $p_1=3$

T0     T1     T2     T3     T4     Time

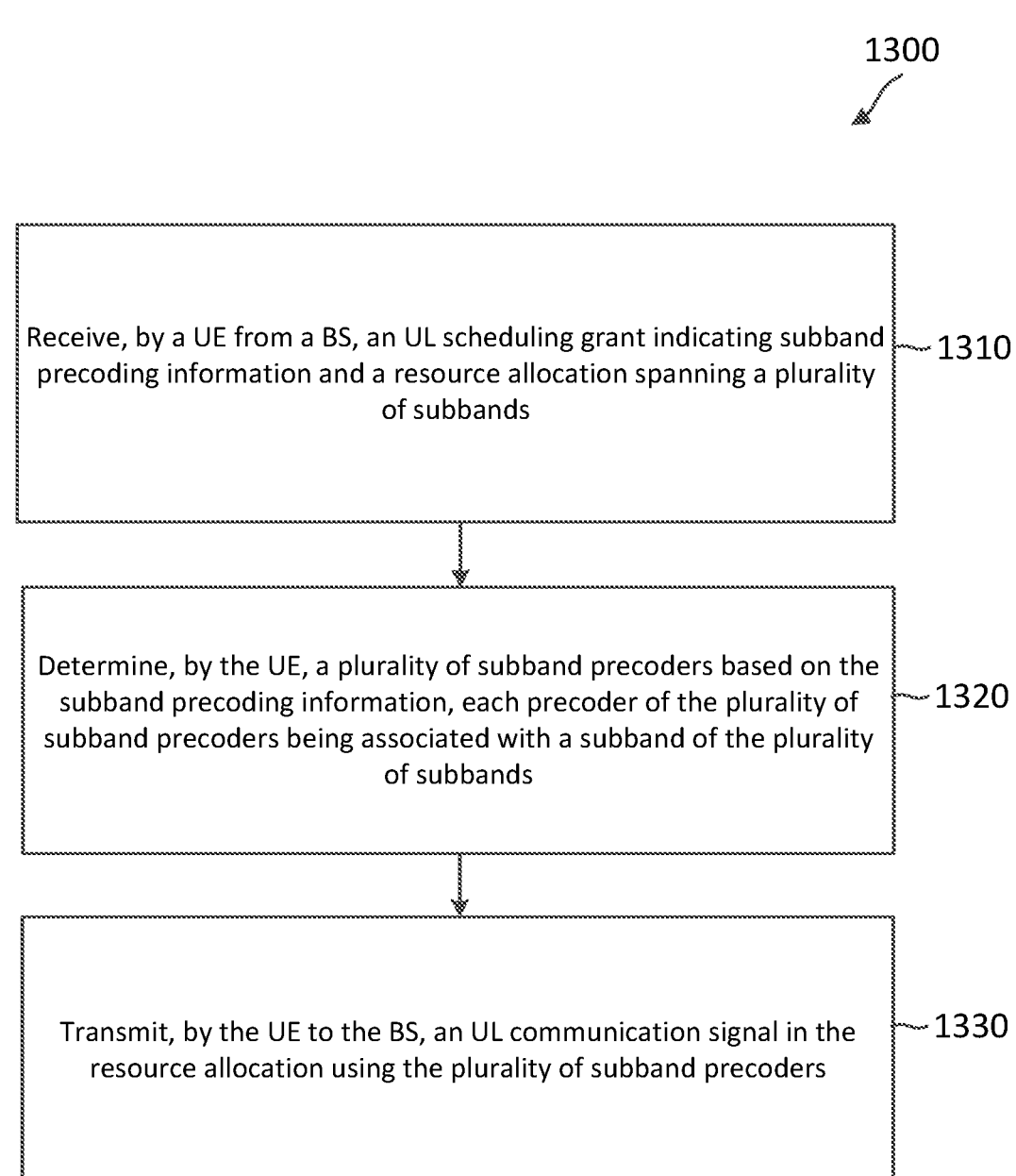

1300

Receive, by a UE from a BS, an UL scheduling grant indicating subband precoding information and a resource allocation spanning a plurality of subbands   1310

Determine, by the UE, a plurality of subband precoders based on the subband precoding information, each precoder of the plurality of subband precoders being associated with a subband of the plurality of subbands   1320

Transmit, by the UE to the BS, an UL communication signal in the resource allocation using the plurality of subband precoders   1330

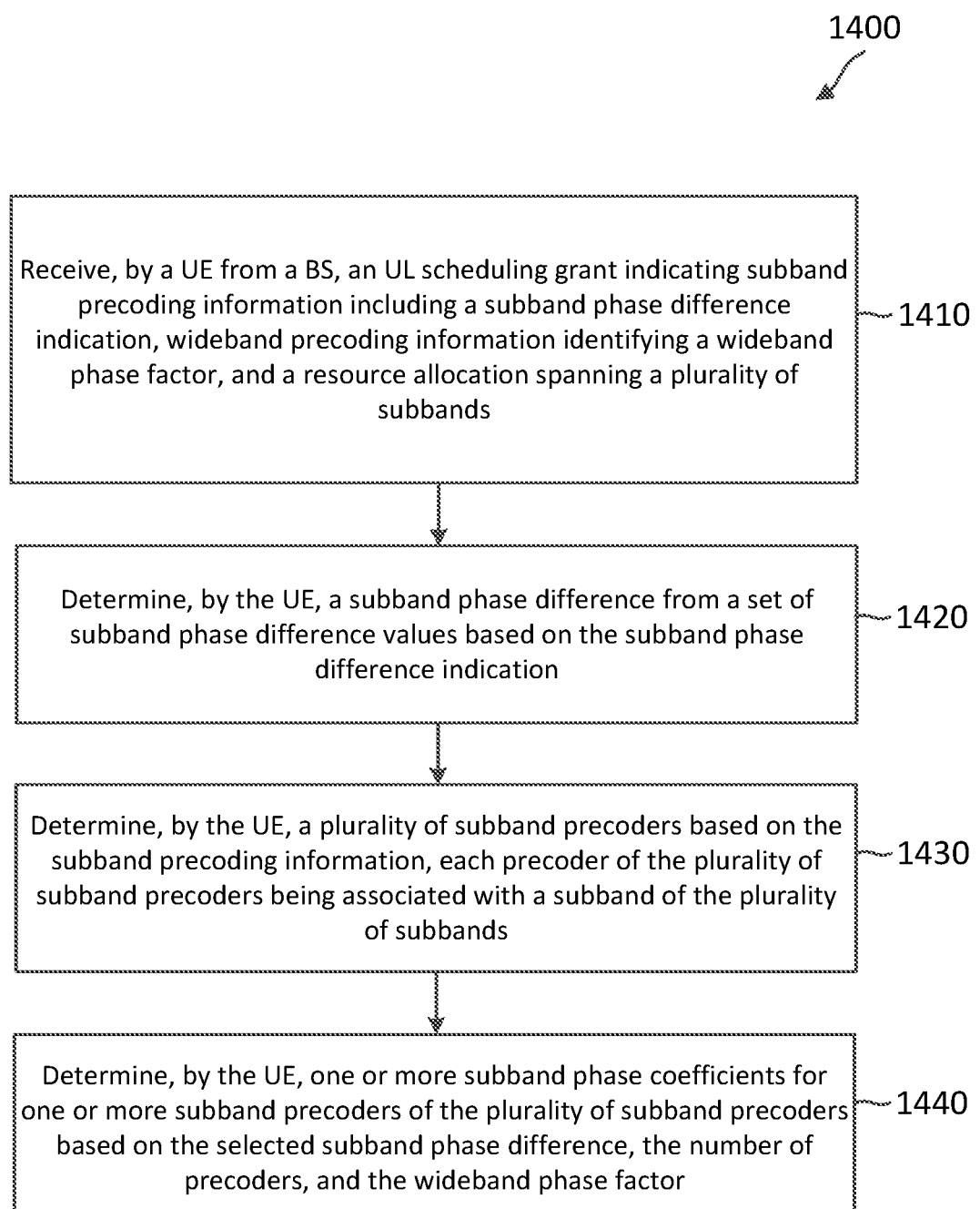

Receive, by a UE from a BS, an UL scheduling grant indicating subband precoding information including a subband phase difference indication, wideband precoding information identifying a wideband phase factor, and a resource allocation spanning a plurality of subbands — 1410

Determine, by the UE, a subband phase difference from a set of subband phase difference values based on the subband phase difference indication — 1420

Determine, by the UE, a plurality of subband precoders based on the subband precoding information, each precoder of the plurality of subband precoders being associated with a subband of the plurality of subbands — 1430

Determine, by the UE, one or more subband phase coefficients for one or more subband precoders of the plurality of subband precoders based on the selected subband phase difference, the number of precoders, and the wideband phase factor — 1440

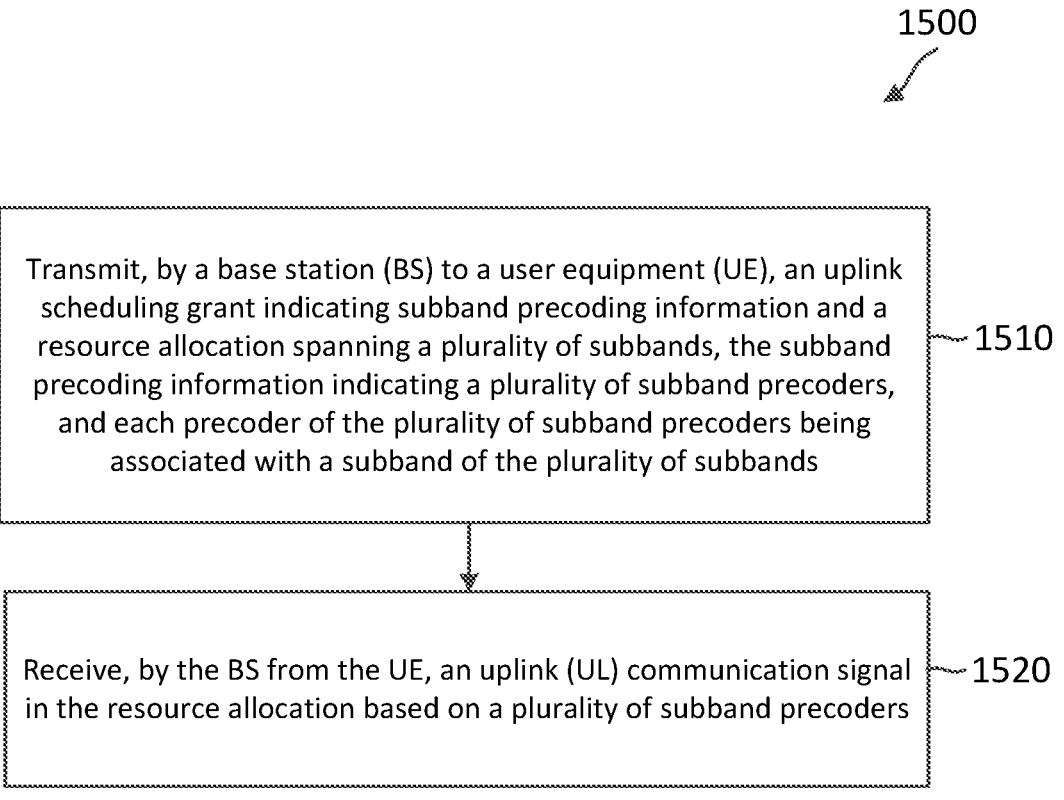

Transmit, by a base station (BS) to a user equipment (UE), an uplink scheduling grant indicating subband precoding information and a resource allocation spanning a plurality of subbands, the subband precoding information indicating a plurality of subband precoders, and each precoder of the plurality of subband precoders being associated with a subband of the plurality of subbands ⟿ 1510

Receive, by the BS from the UE, an uplink (UL) communication signal in the resource allocation based on a plurality of subband precoders ⟿ 1520

FIG. 15

FREQUENCY SELECTIVE PRECODER INDICATION

CROSS-REFERENCE TO RELATED APPLICATIONS

The present application is a 35 U.S.C. 371 National Phase entry of Patent Cooperation Treaty (PCT) Application No. PCT/CN2020/074073, filed Jan. 30, 2020, which is hereby incorporated by reference in its entirety as if fully set forth below for all applicable purposes.

TECHNICAL FIELD

The present disclosure is directed to wireless communication systems and methods. Certain embodiments can enable and provide techniques allowing communication devices (e.g., user equipment devices or base stations) to efficiently indicate a plurality of precoders for a plurality of subbands (e.g., with minimal overhead).

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the long-term evolution (LTE) technology to a next generation new radio (NR) technology, which may be referred to as $5^{th}$ Generation (5G). For example, NR is designed to provide a lower latency, a higher bandwidth or a higher throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

A UE may transmit a data stream using one or more antennas to a BS. The UE may apply a precoder to symbols that are mapped to a plurality of subbands. In conventional wideband precoding, the UE applies only one precoder ("a wideband precoder") for all subbands across the physical uplink shared channel (PUSCH) assignment. In subband precoding, the UE may apply a plurality of precoders for a plurality of subbands across the PUSCH assignment.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In an aspect of the disclosure, a method of wireless communication includes receiving, by a user equipment (UE) from a base station (BS), an uplink (UL) scheduling grant indicating subband precoding information and a resource allocation spanning a plurality of subbands; determining, by the UE, a plurality of subband precoders based on the subband precoding information, each precoder of the plurality of subband precoders being associated with a subband of the plurality of subbands; and transmitting, by the UE to the BS, an UL communication signal in the resource allocation using the plurality of subband precoders.

In an aspect of the disclosure, an apparatus includes a transceiver configured to: receive, by a user equipment (UE) from a base station (BS), an uplink (UL) scheduling grant indicating subband precoding information and a resource allocation spanning a plurality of subbands; and transmit, by the UE to the BS, an UL communication signal in the resource allocation using a plurality of subband precoders; and a processor configured to determine, by the UE, the plurality of subband precoders based on the subband precoding information, wherein each precoder of the plurality of subband precoders is associated with a subband of the plurality of subbands.

In an aspect of the disclosure, a computer-readable medium having program code recorded thereon, the program code including: code for causing a user equipment (UE) to receive from a base station (BS), an uplink (UL) scheduling grant indicating subband precoding information and a resource allocation spanning a plurality of subbands; code for causing the UE to determine a plurality of subband precoders based on the subband precoding information, each precoder of the plurality of subband precoders being associated with a subband of the plurality of subbands; and code for causing the UE to transmit to the BS, an UL communication signal in the resource allocation using the plurality of subband precoders.

In an aspect of the disclosure, an apparatus includes means for means for receiving from a base station (BS), an uplink (UL) scheduling grant indicating subband precoding information and a resource allocation spanning a plurality of subbands; means for determining a plurality of subband precoders based on the subband precoding information, each precoder of the plurality of subband precoders being associated with a subband of the plurality of subbands; and means for transmitting to the BS, an UL communication signal in the resource allocation using the plurality of subband precoders.

In an aspect of the disclosure, a method of wireless communication includes transmitting, by a base station (BS) to a user equipment (UE), an uplink scheduling grant indicating subband precoding information and a resource allocation spanning a plurality of subbands, the subband precoding information indicating a plurality of subband precoders, and each precoder of the plurality of subband precoders being associated with a subband of the plurality of subbands; and receiving, by the BS from the UE, an uplink (UL) communication signal in the resource allocation based on a plurality of subband precoders.

In an aspect of the disclosure, an apparatus includes a transceiver configured to: transmit, by a base station (BS) to a user equipment (UE), an uplink scheduling grant indicating subband precoding information and a resource allocation spanning a plurality of subbands, the subband precoding information indicating a plurality of subband precoders, and each precoder of the plurality of subband precoders being associated with a subband of the plurality of subbands; and receive, by the BS from the UE, an uplink (UL) communication signal in the resource allocation based on a plurality of subband precoders.

In an aspect of the disclosure, a computer-readable medium having program code recorded thereon, the program code including: code for causing a base station (BS) to transmit to a user equipment (UE), an uplink (UL) scheduling grant indicating subband precoding information and a resource allocation spanning a plurality of subbands; and code for causing the BS to receive from the UE, an uplink (UL) communication signal in the resource allocation based on a plurality of subband precoders.

In an aspect of the disclosure, an apparatus includes means for means for transmitting to a user equipment (UE), an uplink scheduling grant indicating subband precoding information and a resource allocation spanning a plurality of subbands, the subband precoding information indicating a plurality of subband precoders, and each precoder of the plurality of subband precoders being associated with a subband of the plurality of subbands; and means for receiving from the UE, an uplink (UL) communication signal in the resource allocation based on a plurality of subband precoders.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present disclosure can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

FIG. 6 is a signaling diagram of a subband phase coefficient communication method according to one or more aspects of the present disclosure.

FIG. 8 is a signaling diagram of a subband precoding communication method according to one or more aspects of the present disclosure.

FIG. 9 is a signaling diagram of a subband precoding communication method according to one or more aspects of the present disclosure.

FIG. 13 is a flow diagram of a communication method according to some aspects of the present disclosure.

FIG. 14 is a flow diagram of a communication method according to some aspects of the present disclosure.

FIG. 15 is a flow diagram of a communication method according to some aspects of the present disclosure.

DETAILED DESCRIPTION

Figure 1:
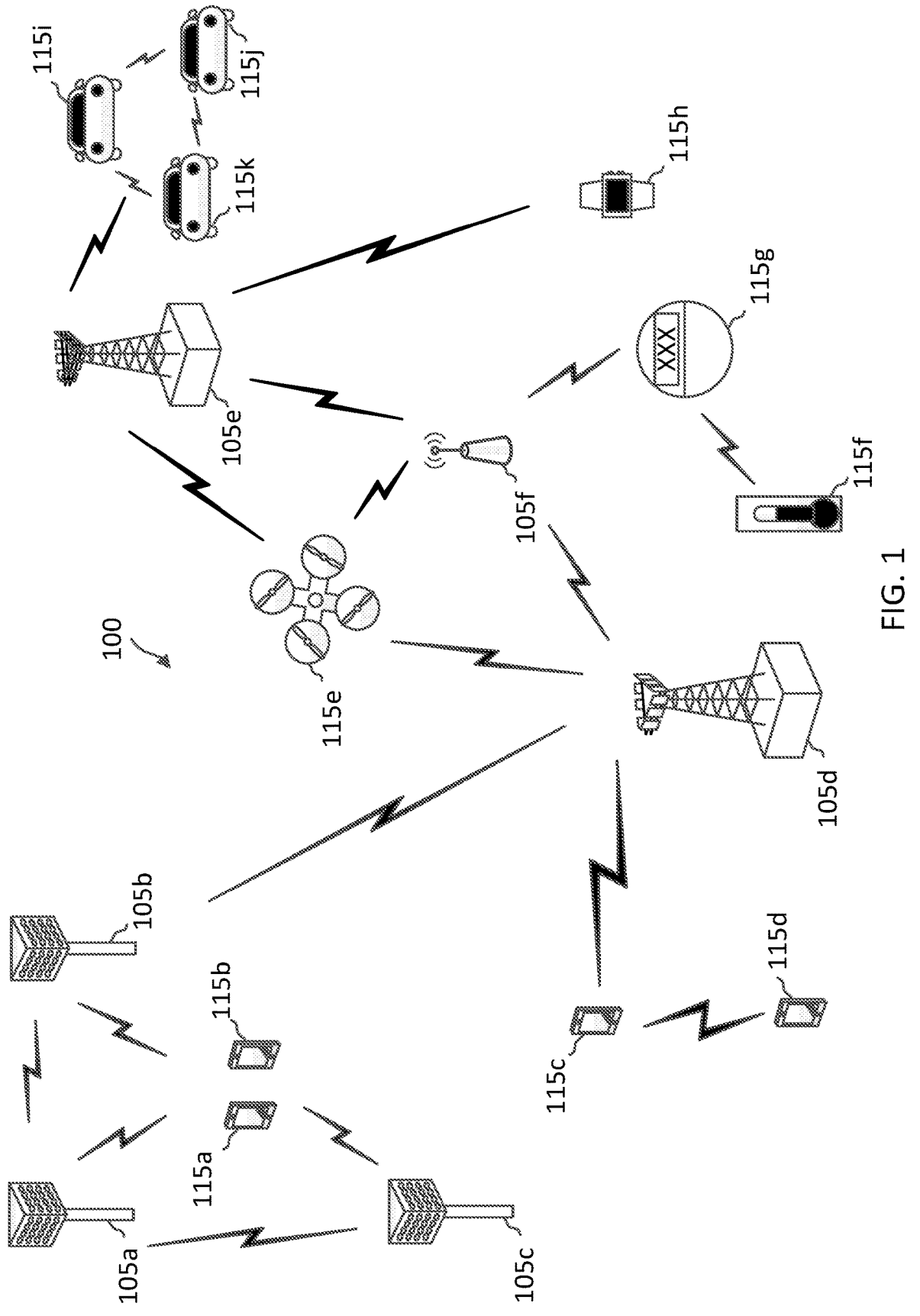
FIG. 1 illustrates a wireless communication network according to one or more aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form to avoid obscuring such concepts.

This disclosure relates generally to wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an Ultra-high density (e.g., ~1M nodes/km²), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km²), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing (SCS), may efficiently address operating diverse services across diverse spectrum and diverse deployments. For example, in various outdoor and macro coverage deployments of less than 3 GHz FDD/TDD implementations, SCS may occur with 15 kHz, for example over 5, 10, 20 MHz, and the like bandwidth (BW). For other various outdoor and small cell coverage deployments of TDD greater than 3 GHz, SCS may occur with 30 kHz over 80/100 MHz BW. For other various indoor wideband implementations, using a TDD over the unlicensed portion of the 5 GHz band, the SCS may occur with 60 kHz over a 160 MHz BW. Finally, for various deployments transmitting with mmWave components at a TDD of 28 GHz, the SCS may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with UL/downlink scheduling information, data, and acknowledgement in the same subframe. The self-contained integrated subframe supports communications in unlicensed or contention-based shared spectrum, adaptive UL/downlink that may be flexibly configured on a per-cell basis to dynamically switch between UL and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects or examples set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may include at least one element of a claim.

A BS may allocate resources spanning a plurality of subbands to a UE. In conventional wideband precoding, the UE applies only one precoder ("a wideband precoder") for all subbands of the plurality of subbands (e.g., across a physical uplink shared channel (PUSCH) assignment). In subband precoding, the UE may apply a plurality of precoders for the plurality of subbands across a PUSCH assignment. Both wideband precoding and subband precoding may have advantages. An advantage of using wideband precoding is its simplicity because only one precoder is signaled and used for a plurality of subbands. An advantage of using subband precoding rather than wideband precoding may provide for beamforming gains. Selection of a given precoder may function as a mechanism for selecting specific beams or beamforming. The BS and UE may communicate information using beams, and each of the BS and the UE may steer its energy in a particular direction, reaping array gains in the process and bridging the link budget. Beamforming techniques may be used to increase the signal level received by a device and to avoid transmission losses when using, for example, mmWave frequencies. A beamformer enhances energy over its targeted/intended direction(s), obtaining a certain antenna gain in a given direction while having attenuation in others. Beamforming combines signals from multiple antenna elements in an antenna array, so that the combined signal level increases when several signal phases align (constructive interference). The signals from each antenna element are transmitted with a slightly different phase (delay) to produce a narrow beam directed towards the receiver. Accordingly, a beamforming gain may result on a per-subband basis.

The present application provides techniques for providing a frequency selective precoder indication. In some aspects, the BS transmits an uplink (UL) scheduling grant indicating subband precoding information and a resource allocation spanning a plurality of subbands to the UE. The UE may determine a plurality of subband precoders based on the subband precoding information, each precoder of the plurality of subband precoders being associated with a subband of the plurality of subbands. Additionally, the UE may transmit to the BS, an UL communication signal in the resource allocation using the plurality of subband precoders.

The signaling overhead can be quite large for indicating a different TPMI for each subband of the plurality of subbands. The present disclosure provides techniques for reducing the indication of some of these parameters when indicating frequency selective TPMI/precoders. For example, the BS may use indices or codewords, as discussed in more detail below, to reduce the signaling overhead when transmitting frequency selective precoder indications. Additionally, as discussed in more detail below, the UE may take into consideration subband phase coefficients for weighting the phase of the beams ($c_{r,i}$), subband phase differences for each subband ($\Theta_{r,i}$), wideband phase factors that are a phase coefficient or phase weighting for the beams ($\psi_{r,i}$). The subband phase coefficient $c_{r,i}$ for each subband may be incremented by the subband phase difference, $\Theta_{r,i}$, and the UE may determine a subband phase coefficient as a vector for different subbands.

FIG. 1 illustrates a wireless communication network 100 according to one or more aspects of the present disclosure. The network 100 may be a 5G network. The network 100 includes a number of base stations (BSs) 105 (individually labeled as 105a, 105b, 105c, 105d, 105e, and 105f) and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of three dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115a-115d are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115e-115h are examples of various machines configured for communication that access the network 100. The UEs 115i-115k are examples of vehicles equipped with wireless communication devices configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink (DL) and/or uplink (UL), desired transmission between BSs 105, backhaul transmissions between BSs, or sidelink transmissions between UEs 115.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f. The macro BS 105d may also transmits multicast services which are subscribed to and received by the UEs 115c and 115d. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115e, which may be a drone. Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-step-size configurations by communicating with another user device which relays its information to the network, such as the UE 115f communicating temperature measurement information to the smart meter, the UE 115g, which is then reported to the network through the small cell BS 105f. The network 100 may also provide additional network efficiency through dynamic, low-latency TDD/FDD communications, such as vehicle-to-vehicle (V2V) communications among the UEs 115i-115k, vehicle-to-everything (V2X) communications between a UE 115i, 115j, or 115k and other UEs 115, and/or vehicle-to-infrastructure (V2I) communications between a UE 115*i*, 115*j*, or 115*k* and a BS 105.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the SCS between adjacent subcarriers may be fixed, and the total number of subcarriers (K) may be dependent on the system BW. The system BW may also be partitioned into subbands. In other instances, the SCS and/or the duration of TTIs may be scalable.

In some aspects, the BSs 105 can assign or schedule transmission resources (e.g., in the form of time-frequency resource blocks (RB)) for DL and UL transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes or slots, for example, about 10. Each slot may be further divided into mini-slots. In a FDD mode, simultaneous UL and DL transmissions may occur in different frequency bands. For example, each subframe includes an UL subframe in an UL frequency band and a DL subframe in a DL frequency band. A subframe may also be referred to as a slot. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information—reference signals (CSI-RSs) to enable a UE 115 to estimate a DL channel. Similarly, a UE 115 may transmit sounding reference signals (SRSs) to enable a BS 105 to estimate a UL channel Control information may include resource assignments and protocol controls. Data may include protocol data and/or operational data. In some aspects, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. An UL-centric subframe may include a longer duration for UL communication than for DL communication.

In some aspects, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining system information (RMSI), and other system information (OSI)) to facilitate initial network access. In some instances, the BSs 105 may broadcast the PSS, the SSS, and/or the MIB in the form of synchronization signal block (SSBs) over a physical broadcast channel (PBCH) and may broadcast the RMSI and/or the OSI over a physical downlink shared channel (PDSCH).

In some aspects, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB, which may be transmitted in the physical broadcast channel (PBCH). The MIB may include system information for initial network access and scheduling information for RMSI and/or OSI. After decoding the MIB, the UE 115 may receive RMSI, OSI, and/or one or more system information blocks (SIBs). The RMSI and/or OSI may include radio resource control (RRC) information related to random access channel (RACH) procedures, paging, control resource set (CORESET) for physical downlink control channel (PDCCH) monitoring, physical UL control channel (PUCCH), physical UL shared channel (PUSCH), power control, and SRS.

After obtaining the MIB, the RMSI and/or the OSI, the UE 115 can perform a random access procedure to establish a connection with the BS 105. After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The scheduling grants may be transmitted in the form of DL control information (DCI). The BS 105 may transmit a DL communication signal (e.g., carrying data) to the UE 115 via a PDSCH according to a DL scheduling grant. The UE 115 may transmit an UL communication signal to the BS 105 via a PUSCH and/or PUCCH according to an UL scheduling grant. In some aspects, the BS 105 may communicate with a UE 115 using HARQ techniques to improve communication reliability, for example, to provide a URLLC service.

In some aspects, the network 100 may operate over a system BW or a component carrier (CC) BW. The network 100 may partition the system BW into multiple BWPs (e.g., portions). A BS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some aspects, a BS 105 may assign a pair of BWPs within the CC to a UE 115 for UL and DL communications. For example, the BWP pair may include one BWP for UL communications and one BWP for DL communications.

In some aspects, the network 100 may operate over a shared channel, which may include shared frequency bands or unlicensed frequency bands. For example, the network 100 may be an NR-unlicensed (NR-U) network operating over an unlicensed frequency band. In such an aspect, the BSs 105 and the UEs 115 may be operated by multiple network operating entities.

In some aspects, the BS 105 and the UE 115 may communicate with each other by utilizing MIMO and beamforming techniques. For instance, the BS 105 may transmit an UL scheduling grant to the UE. The UL scheduling grant may indicate subband precoding information and a resource allocation spanning a plurality of subbands. The UE 115 may use the subband precoding information and the resource allocation information to estimate an UL channel between the BS 105 and the UE 115. To facilitate beamforming at the UE 115, the UE 115 may perform precoding to generate transmission beams with a certain directivity and/or a certain transmit power. To facilitate the precoding process, the BS 105 may transmit a transmit precoding matrix indicator (TPMI) to the UE 115. The TPMI may also be referred to as a precoding matrix. A TPMI index or a matrix W may indicate the precoder for the UE 115 to apply for a subband. The TPMI may include information associated with a wideband precoding matrix and a frequency-selective subband precoding matrix, as will be discussed in greater detail below. The UE 115 may determine a plurality of subband precoders based on the subband precoding information. Each precoder of the plurality of subband precoders may be associated with a subband of the plurality of subbands. The precoding process may include weighting signal phases and/or signal amplitudes at antenna elements of the UE 115. The UE 115 may construct a precoder based on the plurality of subband precoders and generate an UL communication signal (e.g., PUSCH signal) based on the plurality of subband precoders. The UE 115 may transmit the UL communication signal in the resource allocation using the plurality of subband precoders. Mechanisms for determining the plurality of subband precoders are described in greater detail herein.

Figure 2:
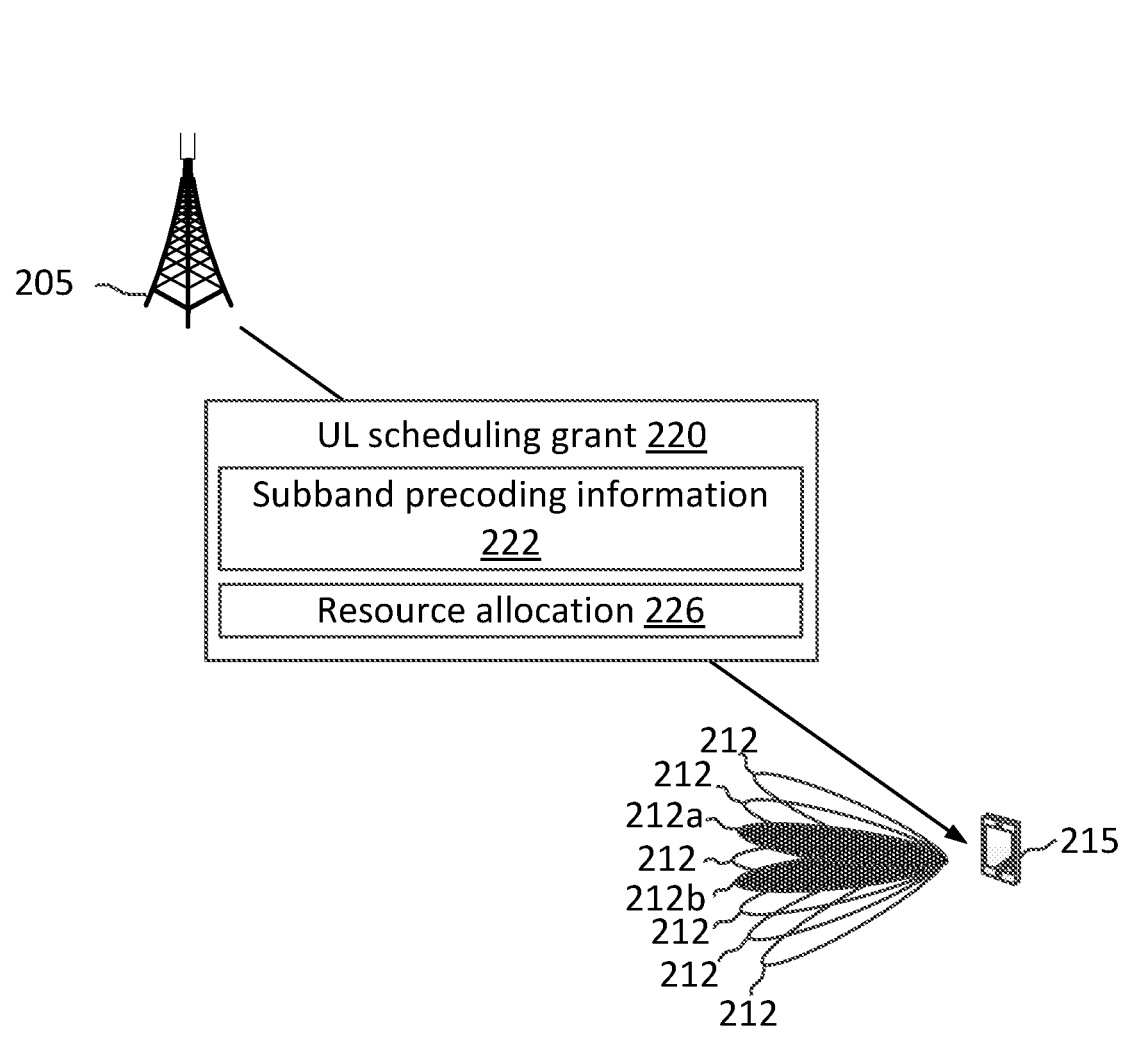
FIG. 2 illustrates a wireless communication network 200 that implements subband precoding according to one or more aspects of the present disclosure.

FIG. 2 illustrates a wireless communication network 200 that implements subband precoding according to one or more aspects of the present disclosure. The network 200 may correspond to a portion of the network 100. FIG. 2 illustrates one BS 205 in communication with one UE 215 for purposes of simplicity of discussion, though it will be recognized that other examples may scale to many more UEs 215 and/or BSs 205. The BS 205 may be similar to the BSs 105. The UE 215 may be similar to the UEs 115.

In some aspects, each of the BSs 205 and the UE 215 may have an array of antenna elements and may apply beamforming techniques to communicate with each other. The antenna array may be in the form of a single panel or multiple panels. Each antenna panel may include a plurality of antenna ports or elements in a vertical dimension and a plurality of antenna ports or elements in a horizontal dimension. In some examples, the BS 205 may have multi-panel antennas and the UE 215 may have a single-panel antenna. In some other examples, the BS 205 and the UE 215 may each have multi-panel antennas. In the illustrated example of FIG. 2, the UE 215 may form beams 212 in an array of angular directions by weighting signal phases and amplitudes at the antenna elements. The UE 215 may utilize the best beam to communicate with the BS 205. The best beam may refer to a high-quality beam, for example, where the beam may have a highest received signal power among a set of beams measured at the BS 205.

In the illustrated example of FIG. 2, the best beams 212 from the UE 215 to the BS 210 may correspond to the beam 212$_a$ and the beam 212$_b$ (shown by the pattern-filled beams). In some instances, the beam 212$_a$ and/or 212$_b$ may reach the BS 205 via a direct line-of-sight (LOS) path. In some instances, the beam 212$_a$ and/or 212$_b$ may reach the BS 205 via a non-direct LOS path, for example, scattering off a certain scatter or clusters in the environment. In some aspects, the UE 215 may utilize codebook-based transmissions to form the beams 212 for communication with the BS 205. For instance, the UE 215 may perform precoding to generate the beams 212$_a$ and 212$_b$ based on a codebook. The codebook may be in the form of a matrix or matrices, which may include the selection of beams, the selection of weights for scaling amplitudes and/or phases at antenna elements of the UE 215 and/or at the antenna ports of the UE 215. In some instances, antenna ports may be virtual antenna ports, which may or may not have a direct mapping to physical antenna elements at the UE 215. In some instances, the codebook may have a dual codebook structure including a wideband matrix and a frequency-selective subband matrix as will be discussed in greater detail below. The codebook may be a predetermined or preconfigured codebook known to the BS 205 and the UE 215. Thus, the BS 205 may select the best beams 212$_a$ and 212$_b$, weightings for the amplitudes and/or phases for the beams 212$_a$ and 212$_b$ from the codebook.

To determine a plurality of subband precoders for a plurality of subbands, the UE 215 may utilize information provided by the BS 205. In some aspects, the BS 205 may transmit an UL scheduling grant 220 to the UE 115. The UL scheduling grant 220 may indicate subband precoding information 222 and a resource allocation 226 spanning the plurality of subbands.

Figure 3:
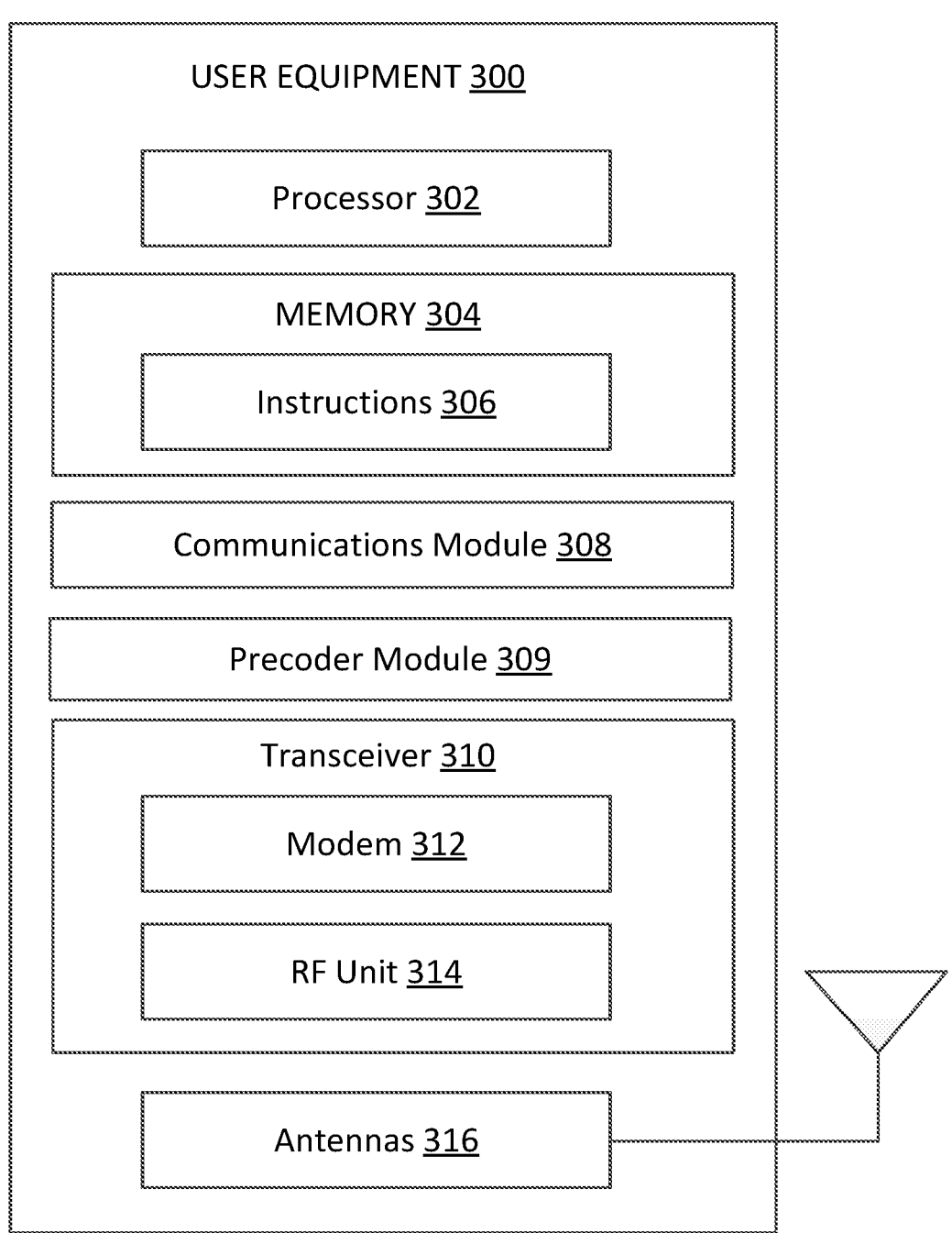
FIG. 3 is a block diagram of a user equipment (UE) according to one or more aspects of the present disclosure.

FIG. 3 is a block diagram of a UE 300 according to one or more aspects of the present disclosure. The UE 300 may be a UE 115 discussed above in FIG. 1. As shown, the UE 300 may include a processor 302, a memory 304, a communications module 308, a precoder module 309, a transceiver 310 including a modem subsystem 312 and a radio frequency (RF) unit 314, and one or more antennas 316. These elements may be in direct or indirect communication with each other, for example via one or more buses.

The processor 302 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 302 may also be implemented as a combination of computing devices, e.g., a combination of a DSP and a microprocessor, a plurality of microprocessors, one or more microprocessors in conjunction with a DSP core, or any other such configuration.

The memory 304 may include a cache memory (e.g., a cache memory of the processor 302), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an aspect, the memory 304 includes a non-transitory computer-readable medium. The memory 304 may store, or have recorded thereon, instructions 306. The instructions 306 may include instructions that, when executed by the processor 302, cause the processor 302 to perform the operations described herein with reference to the UEs 115 in connection with aspects of the present disclosure, for example, aspects of FIGS. 1, 2, and 5-14. Instructions 306 may also be referred to as program code. The program code may be for causing a wireless communication device to perform these operations, for example, by causing one or more processors (such as processor 302) to control or command the wireless communication device to do so. The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may include a single computer-readable statement or many computer-readable statements.

The communications module 308 and/or the precoder module 309 may be implemented via hardware, software, or combinations thereof. The communications module 308 and/or the precoder module 309 may be implemented as a processor, circuit, and/or instructions 306 stored in the memory 304 and executed by the processor 302. In some instances, the communications module 308 and/or the precoder module 309 can be integrated within the modem subsystem 312. The communications module 308 and/or the precoder module 309 can be implemented by a combination of software components (e.g., executed by a DSP or a general processor) and hardware components (e.g., logic gates and circuitry) within the modem subsystem 312. The communications module 308 and/or the precoder module 309 may be used for various aspects of the present disclosure, for example, aspects of aspects of FIGS. 1, 2, and 5-14.

In some aspects, the communications module 308 may be configured to receive from a BS, an UL scheduling grant indicating subband precoding information and a resource allocation spanning a plurality of subbands. The communications module 308 may be configured to transmit to the BS, an UL communication signal in the resource allocation using a plurality of subband precoders.

In some aspects, the precoder module 309 may be configured to determine a plurality of subband precoders based on the subband precoding information, each precoder of the plurality of subband precoders being associated with a subband of the plurality of subbands.

As shown, the transceiver 310 may include the modem subsystem 312 and the RF unit 314. The transceiver 310 can be configured to communicate bi-directionally with other devices, such as the BSs 105 or BS 400. The modem subsystem 312 may be configured to modulate and/or encode the data from the memory 304, the communications module 308, and/or the precoder module 309 according to a modulation and coding scheme (MCS), e.g., a low-density parity check (LDPC) coding scheme, a turbo coding scheme, a convolutional coding scheme, a digital beamforming scheme, etc. The RF unit 314 may be configured to process (e.g., perform analog to digital conversion or digital to analog conversion, etc.) modulated/encoded data from the modem subsystem 312 (on outbound transmissions) or of transmissions originating from another source such as a UE 115 or a BS 105, 400. The RF unit 314 may be further configured to perform analog beamforming in conjunction with the digital beamforming. Although shown as integrated together in transceiver 310, the modem subsystem 312 and the RF unit 314 may be separate devices that are coupled together at the UE 115 to enable the UE 115 to communicate with other devices.

The RF unit 314 may provide the modulated and/or processed data, e.g. data packets (or, more generally, data messages that may contain one or more data packets and other information), to the antennas 316 for transmission to one or more other devices. The antennas 316 may further receive data messages transmitted from other devices. The antennas 316 may provide the received data messages for processing and/or demodulation at the transceiver 310. The transceiver 310 may provide the demodulated and decoded data (e.g., UL scheduling grant, subband precoding information, resource allocation, wideband precoding information, etc.) to the communications module 308 and/or the precoder module 309 for processing. The antennas 316 may include multiple antennas of similar or different designs to sustain multiple transmission links. The RF unit 314 may configure the antennas 316.

In some aspects, the transceiver 310 may coordinate with the communications module 308 to receive an UL scheduling grant indicating subband precoding information and a resource allocation spanning a plurality of subbands and/or to transmit an UL communication signal in the resource allocation using a plurality of subband precoders. In some aspects, the transceiver 310 may coordinate with the precoder module 309 to receive subband precoding information.

In some aspects, the UE 300 can include multiple transceivers 310 implementing different radio access technologies (RATs) (e.g., NR and LTE). In an aspect, the UE 300 can include a single transceiver 310 implementing multiple RATs (e.g., NR and LTE). In an aspect, the transceiver 310 can include various components, where different combinations of components can implement different RATs.

Figure 4:
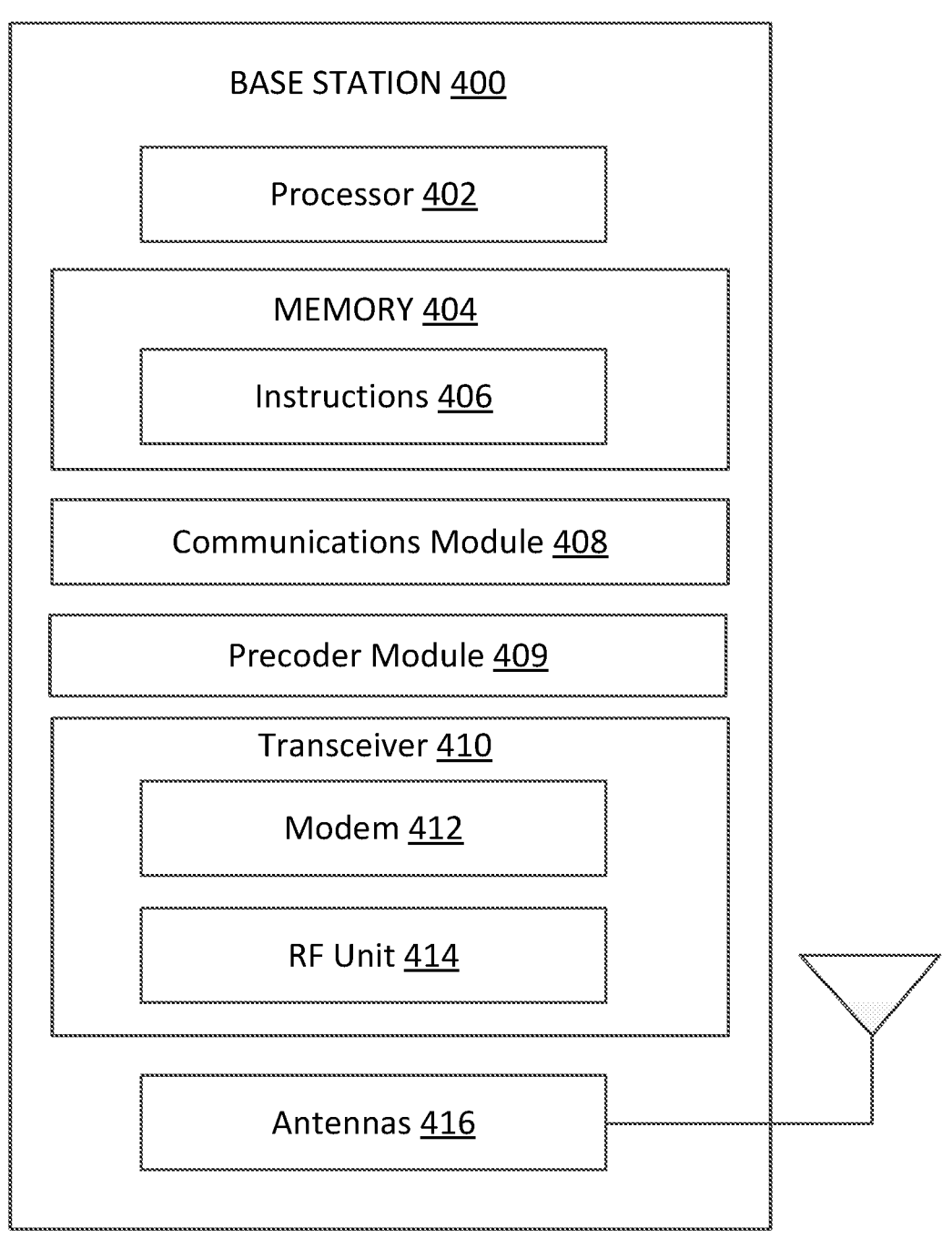
FIG. 4 is a block diagram of a base station (BS) according to one or more aspects of the present disclosure.

FIG. 4 is a block diagram of a BS 400 according to some aspects of the present disclosure. The BS 400 may be a BS 105 as discussed above in FIG. 1. As shown, the BS 400 may include a processor 402, a memory 404, a communications module 408, a precoder module 409, a transceiver 410 including a modem subsystem 412 and a RF unit 414, and one or more antennas 416. These elements may be in direct or indirect communication with each other, for example via one or more buses.

The processor 402 may have various features as a specific-type processor. For example, these may include a CPU, a DSP, an ASIC, a controller, a FPGA device, another hardware device, a firmware device, or any combination thereof configured to perform the operations described herein. The processor 402 may also be implemented as a combination of computing devices, e.g., a combination of a DSP and a microprocessor, a plurality of microprocessors, one or more microprocessors in conjunction with a DSP core, or any other such configuration.

The memory 404 may include a cache memory (e.g., a cache memory of the processor 402), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some aspects, the memory 404 may include a non-transitory computer-readable medium. The memory 404 may store instructions 406. The instructions 406 may include instructions that, when executed by the processor 402, cause the processor 402 to perform operations described herein, for example, aspects of FIGS. 1, 2, 5-12, and 15. Instructions 406 may also be referred to as code, which may be interpreted broadly to include any type of computer-readable statement(s) as discussed above with respect to FIG. 3.

The communications module 408 and/or the precoder module 409 may be implemented via hardware, software, or combinations thereof. The communications module 408 and/or the precoder module 409 may be implemented as a processor, circuit, and/or instructions 406 stored in the memory 404 and executed by the processor 402. In some instances, the communications module 408 and/or the precoder module 409 can be integrated within the modem subsystem 412. The communications module 408 and/or the precoder module 409 can be implemented by a combination of software components (e.g., executed by a DSP or a general processor) and hardware components (e.g., logic gates and circuitry) within the modem subsystem 412. The communications module 408 and/or the precoder module 409 may be used for various aspects of the present disclosure, for example, aspects of FIGS. 12, 5-12, and 15.

In some aspects, the communications module 408 may be configured to transmit to a UE, an uplink scheduling grant indicating subband precoding information and a resource allocation spanning a plurality of subbands, the subband precoding information indicating a plurality of subband precoders, and each precoder of the plurality of subband precoders being associated with a subband of the plurality of subbands. The communications module 408 may be configured to receive from the UE, an UL communication signal in the resource allocation based on a plurality of subband precoders.

As shown, the transceiver 410 may include the modem subsystem 412 and the RF unit 414. The transceiver 410 can be configured to communicate bi-directionally with other devices, such as the UEs 115 and/or UE 700, a BS, and/or another core network element. The modem subsystem 412 may be configured to modulate and/or encode data according to a MCS, e.g., a LDPC coding scheme, a turbo coding scheme, a convolutional coding scheme, a digital beamforming scheme, etc. The RF unit 414 may be configured to process (e.g., perform analog to digital conversion or digital to analog conversion, etc.) modulated/encoded data (e.g., grants, resource allocations) from the modem subsystem 412 (on outbound transmissions) or of transmissions originating from another source such as a UE 115, 715 or 700. The RF unit 414 may be further configured to perform analog beamforming in conjunction with the digital beamforming. Although shown as integrated together in transceiver 410, the modem subsystem 412 and/or the RF unit 414 may be separate devices that are coupled together at the BS 105 to enable the BS 105 to communicate with other devices.

The RF unit 414 may provide the modulated and/or processed data, e.g. data packets (or, more generally, data messages that may contain one or more data packets and other information), to the antennas 416 for transmission to one or more other devices. This may include, for example, transmission of information to complete attachment to a network and communication with a camped UE 115 or UE 700 according to some aspects of the present disclosure. The antennas 416 may further receive data messages transmitted from other devices and provide the received data messages for processing and/or demodulation at the transceiver 410. The transceiver 410 may provide the demodulated and decoded data (e.g., UL scheduling grant, subband precoding information, resource allocation, wideband precoding information, etc.) to the communications module 408 and/or the precoder module 409 for processing. The antennas 416 may include multiple antennas of similar or different designs in order to sustain multiple transmission links.

In some aspects, the transceiver 410 may coordinate with the communications module 408 and/or the precoder module 409 to transmit an UL scheduling grant indicating subband precoding information and a resource allocation spanning a plurality of subbands, the subband precoding information indicating a plurality of subband precoders, and each precoder of the plurality of subband precoders being associated with a subband of the plurality of subbands and/or to receive an UL communication signal in the resource allocation based on a plurality of subband precoders.

In some aspects, the BS 400 can include multiple transceivers 410 implementing different RATs (e.g., NR and LTE). In an aspect, the BS 400 can include a single transceiver 410 implementing multiple RATs (e.g., NR and LTE). In an aspect, the transceiver 410 can include various components, where different combinations of components can implement different RATs.

In some aspects, the BS 105 may transmit an UL scheduling grant in, for example, DCI. The UL scheduling grant may indicate subband precoding information and a resource allocation spanning a plurality of subbands. The UE 115 may receive the DCI and determine, based on the UL scheduling grant, a plurality of subband precoders based on the subband precoding information. Each precoder of the plurality of subband precoders may be associated with a subband of the plurality of subbands. The UE 115 may transmit an UL communication signal in the resource allocation using the plurality of subband precoders to the BS 105.

Figure 5:
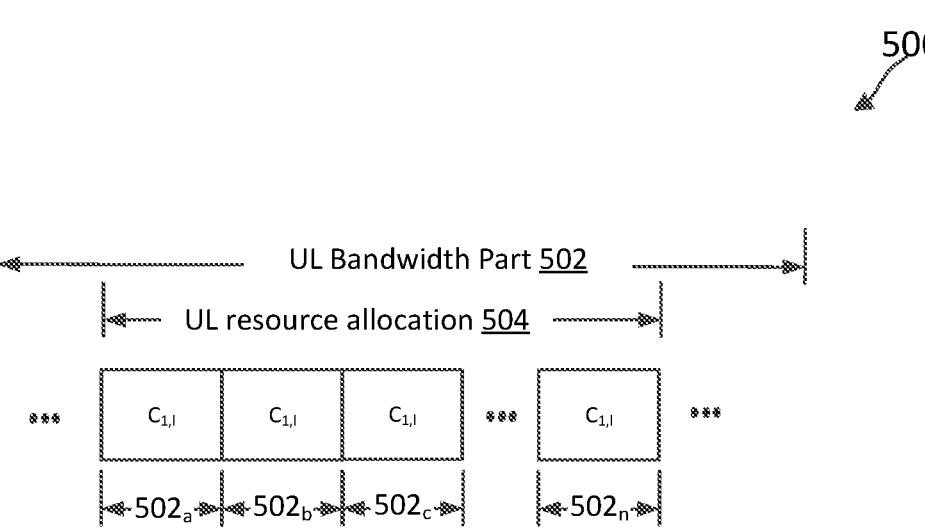
FIG. 5 illustrates an uplink (UL) resource allocation according to one or more aspects of the present disclosure.

FIG. 5 illustrates an UL resource allocation 500 according to one or more aspects of the present disclosure. For instance, a BS 205 may configure a UE 215 with one or more bandwidth parts in the UL. An UL bandwidth part 502 may be a subset of continuous physical resource blocks (PRBs). The BS 205 may allocate an UL resource to the UE 215, which may be shown as an UL resource allocation 504 in FIG. 5. The UL resource allocation 504 may span a plurality of subbands including subbands 502$_a$, 502$_b$, 502$c$, . . . , and 502$_n$. The UE 215 may apply a different or the same precoder for each of the subbands 502$_a$, 502$_b$, 502$_c$, . . . , and 502$_n$ of the resource allocation 504. A precoding matrix may be rewritten as a wideband precoding matrix, denoted as, $W_1^{\square}$, and a subband precoding matrix, denoted as $W_2^{\square}$, as shown below:

$$W^{\square} \approx W_1^{\square} \times W_2^{\square}. \tag{1}$$

The wideband precoding matrix $W_1^{\square}$ may indicate one or more spatial beams and be represented by the following matrix, as shown below:

$$W_1^{\square} = \begin{bmatrix} B & 0 \\ 0 & B \end{bmatrix}, \tag{2}$$

where each of the B matrices is a two-dimensional (2D) submatrix that may be used to indicate beams. For example, a beam may be an oversampled 2D DFT beam (e.g., beams 212$_a$ and 212$_b$ in FIG. 2). The subband precoding matrix $W_2^{\square}$ may represent the subband precoding matrix used by the UE 215 for communication with the BS 205 for a subband. The subband precoding matrix $W_2^{\square}$ may indicate the beam selection when the wideband precoding matrix $W_1^{\square}$ indicates more than one beam and may indicate co-phasing between two beams for a subband. For example, co-phasing can be the beams for two polarizations, where beams may have a relative phase between polarization, e.g., polarization may be at +45 degrees and −45 degrees, and the beams in the two polarizations may be precoded with a relative phase. Additionally, the subband precoding matrix $W_2^{\square}$ is associated with a subband phase coefficient $c_{r,l}$, and the UE 115 may apply a different subband phase coefficient $c_{r,l}$ to each subband to enable a different precoder to be selected for the subband. Additionally, the UE 115 may apply relative phases to the subbands.

The subband phase coefficient $c_{r,l}$ for different subbands may be represented by the following equation, as shown below:

$$c_{r,l} = \left[ e^{-j\psi_{r,l}} e^{-j\left(\psi_{r,l}+\frac{\Theta_{r,l}}{N}\right)} e^{-j\left(\psi_{r,l}+\frac{2\Theta_{r,l}}{N}\right)} \dots e^{-j\left(\psi_{r,l}+\frac{(N-1)\Theta_{r,l}}{N}\right)} \right], \quad (3)$$

where r represents the polarization (r=0,1), l represents the spatial layer (l=0, . . . , L, where L is the rank indicated in the DCI), N is the number of subbands based on the number of PRBs in the UL resource allocation (e.g., UL resource allocation 504) and is a length of entries for the $c_{r,l}$ vector, $c_{r,l}$ represents a subband phase coefficient for weighting the phase of the beams (e.g., beams 212$_a$ and 212$_b$) in a respective subband for the rth polarization and the lth layer, $\Theta_{r,l}$ represents a subband phase difference for each subband for the rth polarization and the lth layer, and $\psi_{r,l}$ represents a wideband phase factor that is a phase coefficient or phase weighting for the beams (e.g., beams 212$_a$ and 212$_b$) for the rth polarization and the lth layer. For the rth polarization and the lth layer, the subband phase coefficient $c_{r,l}$ for each subband may be incremented by the subband phase difference, $\Theta_{r,l}$. The nth element in the vector $c_{r,l}$ represents the phase coefficient for the nth subbands for the rth polarization and the lth layer (n=0, . . . , N−1). Accordingly, for each polarization and for each layer, the UE 115 may determine a subband phase coefficient as a vector for different subbands. Each of these parameters will be discussed in more detail in the disclosure.

If r is 0, there is co-polarization from the antenna array, and if r is 1, there is cross-polarization from the antenna array. Additionally, r may be 0 or 1 for different polarizations. The overall subband precoder of rank L to be constructed after the indication of, $W_1^{\square}$ and $W_2^{\square}$, on a subband may have the following form:

$$W = \frac{1}{\sqrt{g}} \times \begin{bmatrix} w_{0,0}w_{0,1} & \cdots & w_{0,L} \\ w_{1,0}w_{1,1} & \cdots & w_{1,L} \end{bmatrix}, \quad (4)$$

where $w_{r,l}=b_{k_1+k'_{1,l},k_2+k'_{2,l}} \times c_{r,l}$, r=0, 1 (polarization), l=0, 1, and g is a normalization factor. For the rth polarization and the lth layer, the beam $b_{k_1+k'_{1,l},k_2+k'_{2,l}}$ is wideband with a beam index ($k_1+k'_{1,l}$, $k_2+k'_{2,l}$) and the same across different subbands, and the phase coefficient $c_{r,l}$ is subband and different across different subbands.

The BS 205 may transmit DCI indicating an UL scheduling grant, and the UL scheduling grant may indicate a resource allocation spanning the plurality of subbands (e.g., subbands 502$_a$, 502$_b$, 502$_c$, . . . , and 502$_n$). The UE 215 may derive the N parameter in Equation (3) based on the UL frequency-domain resource allocation. In some examples, N is the number of subbands included in the UL resource allocation, and the size of subband can be preconfigured by the RRC signaling. In some examples, N is the number of PRBs included in the UL resource allocation. In some examples, N is a multiple of the number of PRBs included in the UL resource allocation, and each multiple number of PRBs may be referred to as a precoding resource group (PRG) bundling. For example, the BS 105 may allocate Q subbands, and N may be a multiple of Q (e.g., Q=N/2). The UE may determine a number of precoders included in the plurality of subband precoders, where the number of precoders is based on a set of rules and a number of PRBs included in the resource allocation. The rule may be predetermined. For example, a rule may be that the number of precoders is equal to half of the PRBs in the resource allocation.

The UE 115 may determine the phase coefficient per-subband using information provided by the BS 105. FIG. 6 is a signaling diagram of a subband phase coefficient communication method 600 according to one or more aspects of the present disclosure. The method 600 may be implemented between a BS 605 and a UE 615 and may employ similar mechanisms as in the methods 1300, 1400, and/or 1500, described below with respect to FIGS. 13, 14, and 15, respectively. The BS 605 may be similar to the BS 105 or the BS 400 and the UE 615 may be similar to the UE 115 or the UE 300. Additionally, the BS 605 and the UE 615 may operate in a network such as the network 100. As illustrated, the method 600 includes a number of enumerated steps, but aspects of the method 600 may include additional steps before, after, and in between the enumerated steps. In some aspects, one or more of the enumerated steps may be omitted or performed in a different order.

A set of subband phase difference values may include a formula based on the first and second values. In some examples, the formula includes $$[0, \frac{\pi}{P}, \dots \frac{(M-1)\pi}{P}]$$

$$\text{or } [-\frac{(M-1)\pi}{2P}, -\frac{(M-2)\pi}{2P}, \dots 0, \frac{\pi}{2P} \dots \frac{(M-1)\pi}{2P}],$$

where a first value is M, and a second value is P.

At action 610, the BS 605 transmits a first value (M) indicating a number of subband phase differences in a set of subband phase difference values. The UE 615 receives the first value from the BS 605. At action 620, the BS 605 transmits a second value (P) associated with a phase increment across adjacent subband phase difference values in the set of subband phase difference values. The UE 615 receives the second value from the BS 605. The second value may be associated with a channel delay spread and may be inversely proportional to the control channel delay spread. For example, if the channel delay spread is large, then a smaller P may be used. Conversely, if the channel delay spread is small, then a larger P may be used. In some aspects, the BS 605 may transmit the first value and the second value via RRC signaling. The UE 115 may receive the subband precoding information after receiving the first and second values and use the first parameter, the second parameter, and the subband phase difference indication included in the subband precoding information to select the subband phase difference. The UE 615 constructs the set including $$[0, \frac{\pi}{P}, \dots \frac{(M-1)\pi}{P}]$$

after receiving the first and second values, using the first parameter and the second parameter in action 610 and action 620.

At action 630, the BS 605 transmits subband precoding information including a subband phase difference indication. The UE 615 receives the subband precoding information. The subband precoding information may be included in, for example, the UL scheduling grant 220 in FIG. 2.

At action 640, the UE 615 may select a subband phase difference from the set of subband phase difference values based on the subband phase difference indication in the UL scheduling grant 220. The subband phase difference indication may be used as an index into the set of subband phase difference values to select a subband phase difference ($\Theta_{r,l}$)), where $$\Theta_{r,1} \in [0, \frac{\pi}{P}, \dots \frac{(M-1)\pi}{P}] \text{ or}$$

$$\Theta_{r,1} \in [-\frac{(M-1)\pi}{2P}, -\frac{(M-2)\pi}{2P}, \dots 0, \frac{\pi}{2P} \dots \frac{(M-1)\pi}{2P}].$$

For example, if the index of the subband phase difference indication is 0 in the UL scheduling grant 220, then $\Theta_{r,l}=0$. If the index of the subband phase difference indication is 1 in the UL scheduling grant 220, then $$\Theta_{r,1} = \frac{\pi}{P},$$

and so on.

The UE 615 may determine the number of bits used for indicating the subband phase difference indication (the index) for selecting the subband phase difference from the set of subband phase difference values. In some examples, the UE 615 applies the following formula to determine the number of bits to use in the UL scheduling grant 220 (DCI) for indicating the subband phase difference indication: ceil ($\log_2(M)$), where ceil( ) is the ceiling operation, and M is the first value. In some aspects, the UE 615 may select one subband phase difference using ceil($\log_2(M)$) to determine the number of bits used for indicating the subband phase difference indication in the DCI.

In some aspects, the UE 615 may use multiple subband phase differences if the subband phase coefficients are associated with multiple transmissions layers or multiple polarizations. In some examples, the BS 605 transmits the subband precoding information indicating a first subband phase difference indication and a second subband phase difference indication. The first subband phase difference indication may be associated with at least one of a first transmission layer or a first polarization. Additionally, the second subband phase difference indication may be associated with at least one of a second transmission layer different from the first transmission layer or a second polarization different from the first polarization. The UE 615 may select a second subband phase difference from the set of subband phase difference values based on the second subband phase difference indication.

Figure 7:
FIG. 7 illustrates a codeword table according to one or more aspects of the present disclosure.

In some examples, the UE 615 uses an index of a multi-phase difference codeword to select the first subband phase difference indication and the second subband phase difference indication. FIG. 7 illustrates a codeword table 700 according to one or more aspects of the present disclosure. In the example illustrated in FIG. 7, the codeword table 700 includes multiple entries. A first column "Index" refers to the index of the multi-phase difference codeword, and a second column "Codeword (m1, m2)" refers to the subband phase difference indications for selecting multiple subband phase differences. The codeword may indicate the first subband phase difference indication and the second subband phase difference indication. For example, the UE 115 may use the first subband phase difference indication "m1" for determining the first subband phase difference for a first transmission layer or a first polarization and may use the second subband phase difference indication "m2" for determining the second subband phase difference for a second transmission layer different from the first layer or a second polarization different from the first polarization.

The BS 605 may transmit subband precoding information including the index of the multi-phase difference codeword. Using the above example set of subband phase difference values $$[0, \frac{\pi}{P}, \dots \frac{(M-1)\pi}{P}],$$

if the index is [0], the first subband phase difference indication is 0, and the second subband phase difference indication is 1. Accordingly, the UE 615 selects $$(0, \frac{\pi}{P})$$

as the subband phase differences. If the index is [1], the first subband phase difference indication is 1, and the second subband phase difference indication is M. Accordingly, the UE 615 selects $$(\frac{\pi}{P}, \frac{(M-1)\pi}{P})$$

as the subband phase differences. By using a codeword for indicating multiple subband phase difference indications, it may be unnecessary for the BS 605 to transmit a large amount of information to the UE 115 for the UE 115 to determine the multiple subband phase differences.

In some examples, a second subband phase coefficient may be based on a first subband phase coefficient (e.g., $c_{r,l}=f(c_{r,0})$). Accordingly, the UE 615 may determine one or more second subband phase coefficients for the plurality of subband precoders based on the one or more first subband phase coefficients. For example, the BS 605 may indicate the $c_{r,0}$ vector as discussed in the present disclosure, and the UE 615 may use a function to determine the $c_{r,l}$ vector for the remaining polarization and transmission layers. For example, for different layers, a function may be, $c_{r,l}=-c_{r,0}$. The one or more first subband phase coefficients may be associated with at least one of a first transmission layer or a first polarization. Additionally, the one or more second subband phase coefficients may be associated with at least one of a second transmission layer different from the first transmission layer or a second polarization different from the first polarization. By basing the first subband phase coefficient on the second subband phase coefficient, the BS 605 may transmit enough information for the UE 615 to determine one vector ($c_{r,0}$), and the UE 615 may determine another vector ($c_{r,1}$) based on the function applied to ($c_{r,0}$). Accordingly, it may be unnecessary for the BS 605 to transmit a large amount of information to the UE 115 for the UE 115 to determine the multiple subband phase differences.

Referring back to FIG. 6, at action 650, the UE 615 determines one or more subband phase coefficients for one or more subband precoders of a plurality of subband precoders based on the selected subband phase difference. For a multi-layer transmission or multiple polarizations, the UE 615 may determine one or more subband phase coefficients for one or more subband precoders of the plurality of subband precoders based on a second selected subband phase difference. Accordingly, the UE 615 may determine multiple vectors of $c_{r,l}$.

At action 660, the UE 615 transmit an UL communication using the plurality of subband precoders. The BS 605 receives the UL communication from the UE 615.

FIG. 8 is a signaling diagram of a subband precoding communication method 800 according to one or more aspects of the present disclosure. The method 800 may be implemented between a BS 805 and a UE 815 and may employ similar mechanisms as in the methods 1300, 1400, and/or 1500, described below with respect to FIGS. 13, 14, and 15, respectively. The BS 805 may be similar to the BS 105 or the BS 400 and the UE 815 may be similar to the UE 115 or the UE 300. Additionally, the BS 805 and the UE 815 may operate in a network such as the network 100. As illustrated, the method 800 includes a number of enumerated steps, but aspects of the method 800 may include additional steps before, after, and in between the enumerated steps. In some aspects, one or more of the enumerated steps may be omitted or performed in a different order.

At action 810, the BS 805 may transmit an UL scheduling grant indicating wideband precoding information as a first parameter and subband precoding information as a second parameter. The wideband precoding information may identify a beam index and identify a wideband phase factor ($\psi$). The wideband precoding information provides a beam and a wideband co-phasing factor for each polarization and each layer. The subband precoding information may identify a subband phase difference. The UE 815 receives the UL scheduling grant.

At action 820, the UE 815 may identify a beam based on the first parameter for the rth polarization and the lth layer. The first parameter may identify the beam from a set of beams. In an example, a beam $b_{k1,k2}$ may be an oversampled 2D DFT beam, with k1 and k2 being an index for the beam. The UE 815 may determine, based on the first parameter including k1 and k2, the beam $b_{k1,k2}$. In another example, a beam $b_{k1,k'1,l,k2,k'2,l}$ may be another oversampled 2D DFT beam for the rth polarization and the lth layer. The UE 815 may determine the four parameters k1, k1', k2', and k2' using an index or a codeword table.

At action 830, the UE 815 may identify a wideband phase factor using the first parameter as an index into a set of wideband phase factor values. The UE 815 may determine the wideband phase factor using an index or a codeword table.

At action 840, the UE 815 may determine one or more subband phase coefficients for one or more subband precoders of a plurality of subband precoders based on the wideband phase factor and the second parameter for the rth polarization and the lth layer. Accordingly, the UE 815 may determine the plurality of subbands by determining one subband precoder for each subband of the plurality of subbands based on the wideband phase factor and the second parameter for the rth polarization and the lth layer.

At action 850, the UE 815 may generate an UL communication signal based on the plurality of precoders and the beam on the corresponding subband. At action 860, the UE 815 may transmit the UL communication signal to the BS 805. The BS 805 receives the UL communication signal from the UE 815.

FIG. 9 is a signaling diagram of a subband precoding communication method 900 according to one or more aspects of the present disclosure. The method 900 may be implemented between a BS 905 and a UE 915 and may employ similar mechanisms as in the methods 1300, 1400, and/or 1500, described below with respect to FIGS. 13, 14, and 15, respectively. The BS 905 may be similar to the BS 105 or the BS 400 and the UE 915 may be similar to the UE

115 or the UE 300. Additionally, the BS 905 and the UE 915 may operate in a network such as the network 100. As illustrated, the method 900 includes a number of enumerated steps, but aspects of the method 900 may include additional steps before, after, and in between the enumerated steps. In some aspects, one or more of the enumerated steps may be omitted or performed in a different order.

At action 910, the BS 905 transmits an UL scheduling grant indicating subband precoding information, wideband precoding information, and a beam group offset. The UE 915 receives the UL scheduling grant. The UE 915 receives the UL scheduling grant. At action 920, the UE 915 identifies a parameter (i) based on the wideband precoding information. At action 930, the UE 915 selects a number of adjacent beams based on the beam group offset and the parameter (i). At action 940, the UE 915 determines, based on the beam group offset and a first beam of the number of adjacent beams, a beam cycling pattern having the number of adjacent beams. At action 950, the UE 915 determines a plurality of subband precoders based on the subband precoding information. At action 960, the UE 915 applies a subband precoder of the plurality of subband precoders and the first from the beam cycling pattern for each subband of the plurality of subbands. At action 970, the UE 915 transmits an UL communication signal using the plurality of precoders. The BS 905 receives the UL communication signal from the UE 915.

For rank=1 and 2, four beams are selected in $W_1$ (see equations (1) and (2)). The beam $b_{k1,k2}$ may be indicated by the wideband precoding information and may be an oversampled 2D DFT beam of length. The index k1, k2 for the beam $b_{k1,k2}$ may be represented by the following equations:

$$k1 = i_{1,1} s_1 + p_1, \tag{4}$$

$$k2 = i_{1,2} s_2 + p_2, \tag{5}$$

where $i_{1,1}$ and $i_{1,2}$ are indicated by the wideband precoding information, a beam group offset (e.g., $(s_1, s_2) = (1,1)$ for L=1 and (2,2) for L=4), and $p_1$ and $p_2$ represent selected beams that can be used for beam cycling in the UL associated with the indicated wideband precoding information and beam group offset. A particular value of $p_1$ and $p_2$ may indicate a beam index (e.g., 1 out of 4) from the beams indicated by the wideband precoding information and group offset. The parameter i is indicated in the wideband precoding information and also in the wideband phase factor ($\psi$). Additionally, the beam group offset ($s_1$, $s_2$) is indicated in the wideband precoding information.

Figure 10:
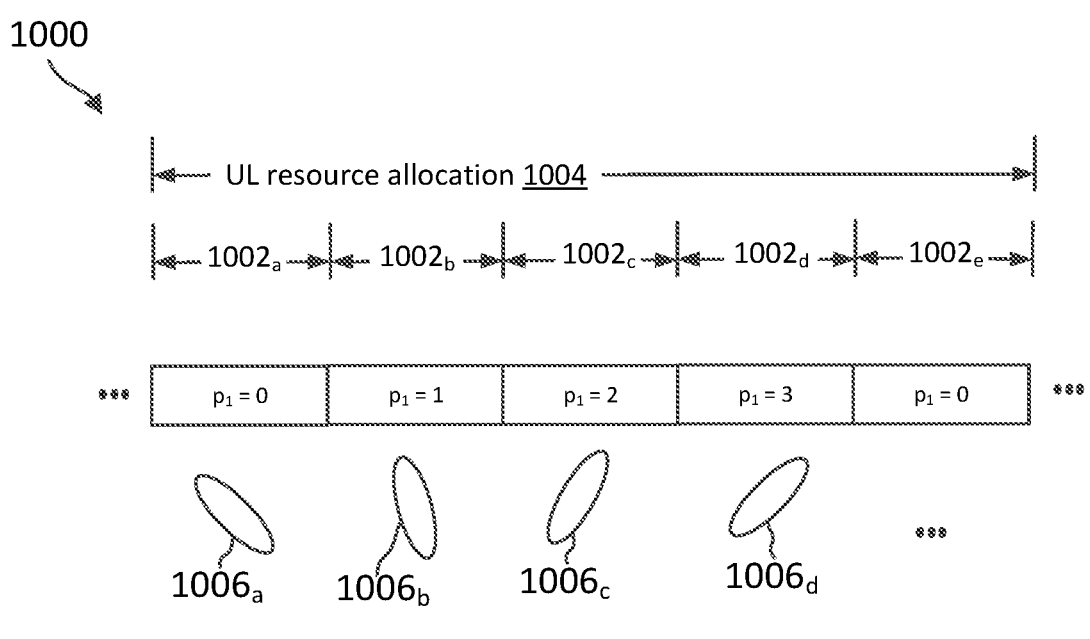
FIG. 10 is an illustration of beam cycling on the frequency domain in UL according to one or more aspects of the present disclosure.

FIG. 10 is an illustration of beam cycling on the frequency domain in UL according to one or more aspects of the present disclosure. In the example illustrated in FIG. 10, L=4, $N_2$=1: $p_1 \in \{0,1,2,3\}$; $p_2$=0, where $N_2$=1 represents a one-dimensional (1D) antenna port layout. Accordingly, the UE 915 may determine four beams (e.g., 1006$_a$, 1006$_b$, 1006$_c$, and 1006$_d$) indicated by the wideband precoding information, where the four beams are adjacent to each other. The spatial direction of the four beams may be adjacent to each other. The BS 905 may allocate a resource 1004 to the UE 915 for UL communications. The UL resource allocation 1004 may include a plurality of subbands including subbands 1002$_a$, 1002$_b$, 1002c, 1002$_d$, and 1002$_e$. The UE 915 may apply a first precoder of the plurality of precoders and a beam 1006$_a$ from the beam cycling pattern for the subband 1002$_a$. The UE 915 may apply a second precoder of the plurality of precoders and a beam 1006$_b$ from the beam cycling pattern for the subband 1002$_b$. The UE 915 may apply a third precoder of the plurality of precoders and a beam $1006_c$ from the beam cycling pattern for the subband $1002c$. The UE 915 may apply a fourth precoder of the plurality of precoders and a beam $1006_d$ from the beam cycling pattern for the subband $1002_d$. The UE 115 may repeat the beam pattern for subsequent subbands of the plurality of subbands.

Figure 11:
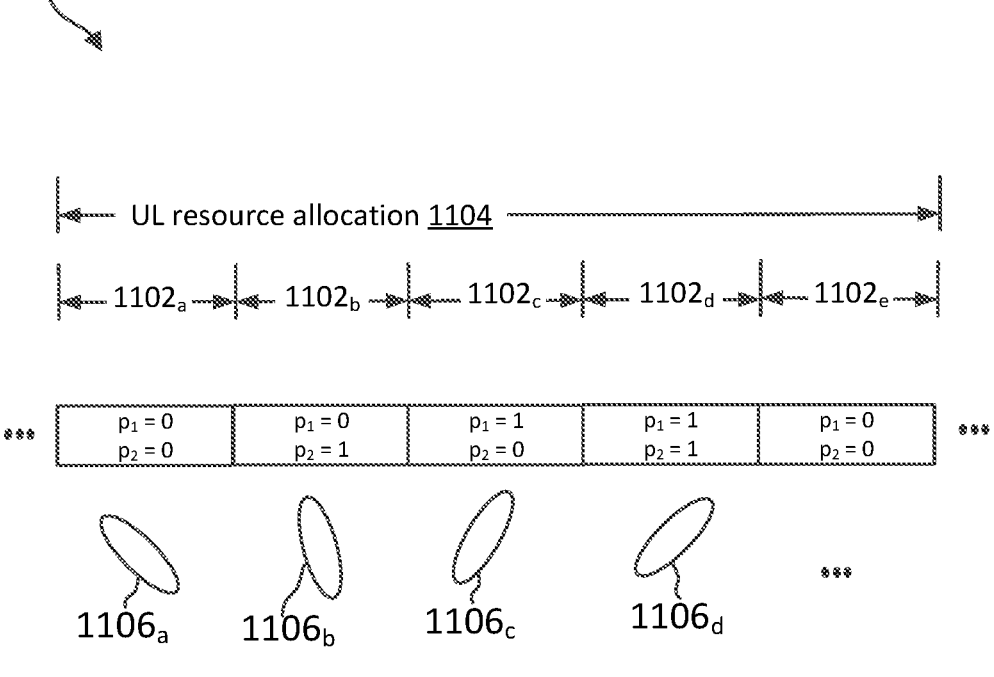
FIG. 11 is another illustration of beam cycling on the frequency domain in UL according to one or more aspects of the present disclosure.

FIG. 11 is another illustration of beam cycling on the frequency domain in UL according to one or more aspects of the present disclosure. In the example illustrated in FIG. 11, L=4, $N_2$>1: $p_1\in\{0,1\}$; $p_2\in\{0,1\}$, where $N_2$>1 represents a 2D antenna port layout. Accordingly, the UE 915 may determine four beams indicated by the wideband precoding information, where the four beams may be adjacent to each other. The spatial direction of the four beams may be adjacent to each other. The BS 905 may allocate a resource 1104 to the UE 915 for UL communications. The UL resource allocation 1104 may include a plurality of subbands including subbands $1102_a$, $1102_b$, $1102_c$, $1102_d$, and $1102_e$. The UE 915 may apply a first precoder of the plurality of precoders and a beam $1106_a$ from the beam cycling pattern for the subband $1102_a$. The UE 915 may apply a second precoder of the plurality of precoders and a beam $1106_b$ from the beam cycling pattern for the subband $1102_b$. The UE 915 may apply a third precoder of the plurality of precoders and a beam $1106_c$ from the beam cycling pattern for the subband $1102_c$. The UE 915 may apply a fourth precoder of the plurality of precoders and a beam $1106_d$ from the beam cycling pattern for the subband $1102_d$. The UE 115 may repeat the beam pattern for subsequent subbands of the plurality of subbands.

Figure 12:
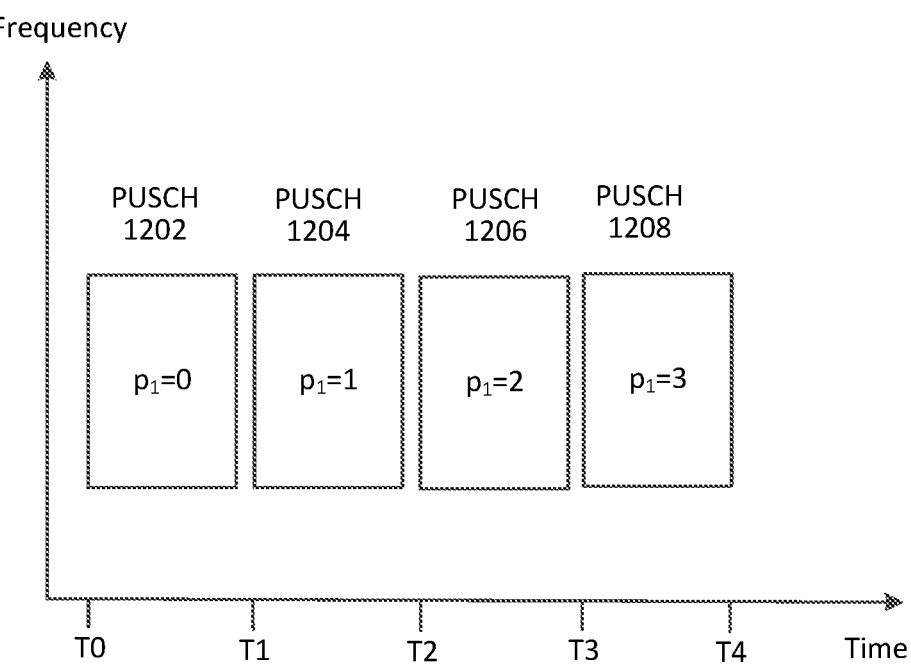
FIG. 12 is an illustration of beam cycling on the time domain in UL according to one or more aspects of the present disclosure.

FIG. 12 is an illustration of beam cycling on the time domain in UL according to one or more aspects of the present disclosure. In the example illustrated in FIG. 12, the UE 915 may be scheduled in PUSCH, which may be repeated to transmit four different times. The UE 915 may determine four beams indicated by the wideband precoding information, where the four beams may be adjacent to each other. For each time period, the UE 915 may transmit a number of UL transmissions in PUSCH using the number of subband precoders of the plurality of subband precoders based on a beam pattern having a sequence of adjacent beams. For example, the time period may be from time T0 to time T4, and the UE 915 may transmit four UL transmissions in PUSCH using four precoders based on a beam pattern having a sequence of adjacent beams. At time T0, the UE 915 may transmit an UL communication in PUSCH 1202 using a first precoder based on a beam pattern having a sequence of adjacent beams. At time T1, the UE 915 may transmit an UL communication in PUSCH 1204 using a second precoder based on the beam pattern having the sequence of adjacent beams. At time T2, the UE 915 may transmit an UL communication in PUSCH 1206 using a third precoder based on the beam pattern having the sequence of adjacent beams. At time T3, the UE 915 may transmit an UL communication in PUSCH 1208 using a fourth precoder based on the beam pattern having the sequence of adjacent beams. The UE 115 may repeat the beam pattern for each time period, as discussed.

FIG. 13 is a flow diagram of a communication method 1300 according to one or more aspects of the present disclosure. Blocks of the method 1300 can be executed by a computing device (e.g., a processor, processing circuit, and/or other suitable component) of a wireless communication device or other suitable means for performing the steps. For example, a wireless communication device, such as the UE 115, 215, 300, 615, 815, and/or 915 may utilize one or more components, such as the processor 302, the memory 304, the communications module 308, the precoder module 309, the transceiver 310, the modem 312, and the one or more antennas 316, to execute the steps of method 1300. As illustrated, the method 1300 includes a number of enumerated blocks, but aspects of the method 1300 may include additional blocks before, after, and in between the enumerated blocks. In some aspects, one or more of the enumerated blocks may be omitted or performed in a different order.

At block 1310, the method 1300 includes receiving, by a UE from a BS, an UL scheduling grant indicating subband precoding information and a resource allocation spanning a plurality of subbands.

At block 1320, the method 1300 includes determining, by the UE, a plurality of subband precoders based on the subband precoding information, each precoder of the plurality of subband precoders being associated with a subband of the plurality of subbands.

In some aspects, the subband precoding information includes a first subband phase difference indication. The UE may receive a first value indicating a number of subband phase differences in a set of subband phase difference values and may receive a second value associated with a phase increment across adjacent subband phase difference values in the set of subband phase difference values. The UE may select a subband phase difference from the set of subband phase difference values based on the first subband phase difference indication. The UE may determine one or more subband phase coefficients for one or more subband precoders of the plurality of subband precoders based on the selected subband phase difference. The second value may be associated with a channel delay spread. The second value may be inversely proportional to the control channel delay spread. The UE may receive the first value and/or the second value via RRC signaling. The UE may receive the scheduling grant after receiving the first and second values.

The set of subband phase difference values may include a formula based on the first and second values. For example, the formula may include $$[0, \frac{\pi}{P}, \cdots \frac{(M-1)\pi}{P}],$$

where the first value is M, and the second value is P. The UE may determine one or more second subband phase coefficients for the plurality of subband precoders based on the one or more first subband phase coefficients, where the one or more first subband phase coefficients are associated with at least one of a first transmission layer or a first polarization, and where the one or more second subband phase coefficients are associated with at least one of a second transmission layer different from the first transmission layer or a second polarization different from the first polarization.

In some aspects, the first subband phase difference indication is associated with at least one of a first transmission layer or a first polarization, and the subband precoding information includes a second subband phase difference indication associated with at least one of a second transmission layer different from the first transmission layer or a second polarization different from the first polarization. The UE may select a second subband phase difference from the set of subband phase difference values based on the second subband phase difference indication and determine one or more subband phase coefficients for one or more subband precoders of the plurality of subband precoders based on the second selected subband phase difference. In some aspects, the subband precoding information includes an index of a multi-phase difference codeword, the codeword indicating the first subband phase difference indication and the second subband phase difference indication.

In some aspects, the UL scheduling grant further indicates a beam group offset. The UE may select a number of adjacent beams based on the beam group offset and determine a beam cycling pattern having the number of adjacent beams. The UE may determine the beam cycling pattern based on the beam group offset and a first beam of the number of adjacent beams. The UE may apply a subband precoder of the plurality of subband precoders and a beam from the beam cycling pattern for each subband of the plurality of subbands. In some aspects, for each time period, the UE may transmit a number of UL transmissions in PUSCH using a number of subband precoders of the plurality of subband precoders based on a beam pattern having a sequence of adjacent beams.

At block 1330, the method 1300 includes transmitting, by the UE to the BS, an UL communication signal in the resource allocation using the plurality of subband precoders. The UE may determine, based on a set of rules and a number of PRBs included in the resource allocation, a number of precoders included in the plurality of subband precoders.

FIG. 14 is a flow diagram of a communication method 1400 according to one or more aspects of the present disclosure. Blocks of the method 1400 can be executed by a computing device (e.g., a processor, processing circuit, and/or other suitable component) of a wireless communication device or other suitable means for performing the blocks. For example, a wireless communication device, such as the UE 115, 215, 300, 615, 815, and/or 915 may utilize one or more components, such as the processor 302, the memory 304, the communications module 308, the precoder module 309, the transceiver 310, the modem 312, and the one or more antennas 316, to execute the steps of method 1300. As illustrated, the method 1400 includes a number of enumerated blocks, but aspects of the method 1400 may include additional blocks before, after, and in between the enumerated blocks. In some aspects, one or more of the enumerated blocks may be omitted or performed in a different order.

At block 1410, the method 1400 includes receiving, by a UE from a BS, an UL scheduling grant indicating subband precoding information including a subband phase difference indication, wideband precoding information identifying a wideband phase factor, and a resource allocation spanning a plurality of subbands.

At block 1420, the method 1400 includes determining, by the UE, a subband phase difference from a set of subband phase difference values based on the subband phase difference indication.

At block 1430, the method 1400 includes determining, by the UE, a plurality of subband precoders based on the subband precoding information, each precoder of the plurality of subband precoders being associated with a subband of the plurality of subbands.

At block 1440, the method 1400 includes determining, by the UE, one or more subband phase coefficients for one or more subband precoders of the plurality of subband precoders based on the selected subband phase difference, the number of precoders, and the wideband phase factor.

In some aspects, the UL scheduling grant indicates wideband precoding information as a first parameter and the subband precoding information as a second parameter, and the wideband precoding information identifies a beam index and identifies a wideband phase factor. The UE may determine the plurality of subband precoders by determining one subband precoder for each subband of the plurality of subbands based on the wideband phase factor. The UE may identify a beam from a set of beams based on the first parameter and may identify the wideband phase factor using the second parameter as an index into a set of wideband phase factor values. The UE may construct a precoder based on the plurality of subband precoders and may determine one or more subband phase coefficients for one or more subband precoders of the plurality of subband precoders based on the wideband phase factor. The UE may generate the UL communication signal based on the plurality of subband precoders and the beam.

FIG. 15 is a flow diagram of a communication method 1500 according to some aspects of the present disclosure. Blocks of the method 1500 can be executed by a computing device (e.g., a processor, processing circuit, and/or other suitable component) of a wireless communication device or other suitable means for performing the blocks. For example, a wireless communication device, such as the BS 105, 205, 400, 605, 805, and/or 905 may utilize one or more components, such as the processor 402, the memory 404, the communications module 408, the precoder module 409, the transceiver 410, the modem 412, and the one or more antennas 416, to execute the blocks of method 1500. As illustrated, the method 1500 includes a number of enumerated blocks, but aspects of the method 1500 may include additional blocks before, after, and in between the enumerated blocks. In some aspects, one or more of the enumerated blocks may be omitted or performed in a different order.

At block 1510, the method 1500 includes transmitting, by a BS to a UE, an uplink scheduling grant indicating subband precoding information and a resource allocation spanning a plurality of subbands, the subband precoding information indicating a plurality of subband precoders, and each precoder of the plurality of subband precoders being associated with a subband of the plurality of subbands. The UL scheduling grant may indicate or include the information as discussed in the present disclosure.

At block 1520, the method 1500 includes receiving, by the BS from the UE, an UL communication signal in the resource allocation based on a plurality of subband precoders.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication, comprising: receiving, by a user equipment (UE), an uplink (UL) scheduling grant indicating subband precoding information and a resource allocation spanning a plurality of subbands, wherein the subband precoding information includes subband phase difference information;

determining, by the UE, a plurality of subband precoders based on the subband phase difference information, each precoder of the plurality of subband precoders being associated with a subband of the plurality of subbands; and transmitting, by the UE to the BS, an UL communication signal in the resource allocation using the plurality of subband precoders.

2. The method of claim 1, wherein the subband phase difference information includes a first subband phase difference indication, the method further comprising:

receiving, by the UE, a first value indicating a number of subband phase differences in a set of subband phase difference values; receiving, by the UE, a second value associated with a phase increment across adjacent subband phase difference values in the set of subband phase difference values; selecting, by the UE, a subband phase difference from the set of subband phase difference values based on the first subband phase difference indication; and determining, by the UE, one or more subband phase coefficients for one or more subband precoders of the plurality of subband precoders based on the selected subband phase difference.

3. The method of claim 2, wherein the second value is associated with a channel delay spread.

4. The method of claim 3, wherein the second value is inversely proportional to the channel delay spread.

5. The method of claim 2, wherein the receiving a first value includes receiving the first value via radio resource control (RRC) signaling, and wherein the receiving a second value includes receiving the second value via RRC signaling.

6. The method of claim 2, wherein the set of subband phase difference values includes a formula based on the first and second values.

7. The method of claim 6, wherein the formula includes $$[0, \frac{\pi}{P}, \dots \frac{(M-1)\pi}{P}],$$

and wherein the first value is M, and the second value is P.

8. The method of claim 6, further comprising: determining, by the UE, one or more second subband phase coefficients for the plurality of subband precoders based on the one or more first subband phase coefficients, wherein the one or more first subband phase coefficients are associated with at least one of a first transmission layer or a first polarization, and wherein the one or more second subband phase coefficients are associated with at least one of a second transmission layer different from the first transmission layer or a second polarization different from the first polarization.

9. The method of claim 2, wherein the first subband phase difference indication is associated with at least one of a first transmission layer or a first polarization, wherein the subband phase difference information includes a second subband phase difference indication associated with at least one of a second transmission layer different from the first transmission layer or a second polarization different from the first polarization.

10. The method of claim 9, further comprising: selecting, by the UE, a second subband phase difference from the set of subband phase difference values based on the second subband phase difference indication; and determining, by the UE, one or more subband phase coefficients for one or more subband precoders of the plurality of subband precoders based on the second selected subband phase difference.

11. The method of claim 9, wherein the subband phase difference information includes an index of a multi-phase difference codeword, the codeword indicating the first subband phase difference indication and the second subband phase difference indication.

12. The method of claim 2, wherein the receiving the scheduling grant includes receiving the scheduling grant after receiving the first and second values.

13. The method of claim 1, wherein the UL scheduling grant indicates wideband precoding information as a first parameter and the subband precoding information as a second parameter, and the wideband precoding information identifies a beam index and identifies a wideband phase factor, and wherein determining the plurality of subband precoders includes determining one subband precoder for each subband of the plurality of subbands based on the wideband phase factor.

14. The method of claim 13, further comprising: identifying a beam from a set of beams based on the first parameter; and identifying the wideband phase factor using the second parameter as an index into a set of wideband phase factor values.

15. The method of claim 14, further comprising: determining one or more subband phase coefficients for one or more subband precoders of the plurality of subband precoders based on the wideband phase factor; and generating, by the UE, the UL communication signal based on the plurality of subband precoders and the beam.

16. The method of claim 1, further comprising: constructing, by the UE, a precoder based on the plurality of subband precoders.

17. The method of claim 1, wherein the UL scheduling grant further indicates a beam group offset, the method further comprising: selecting a number of adjacent beams based on the beam group offset; determining a beam cycling pattern having the number of adjacent beams, the determining a beam cycling pattern being based on the beam group offset and a first beam of the number of adjacent beams; and applying a subband precoder of the plurality of subband precoders and a beam from the beam cycling pattern for each subband of the plurality of subbands.

18. The method of claim 1, further comprising: for each time period, transmitting a number of UL transmissions in physical UL shared channel (PUSCH) using a number of subband precoders of the plurality of subband precoders based on a beam pattern having a sequence of adjacent beams.

19. The method of claim 1, further comprising: determining, by the UE, a number of precoders included in the plurality of subband precoders, the number of precoders being based on a set of rules and a number of physical resource blocks (PRBs) included in the resource allocation.

20. The method of claim 19, wherein the UL scheduling grant indicates wideband precoding information identifying a wideband phase factor, and wherein the subband phase difference information includes a first subband phase difference indication, the method further comprising: determining, by the UE, a subband phase difference from a set of subband phase difference values based on the first subband phase difference indication; and determining, by the UE, one or more subband phase coefficients for one or more subband precoders of the plurality of subband precoders based on the subband phase difference, the number of precoders, and the wideband phase factor.

21. A non-transitory computer-readable medium having program code recorded thereon, the program code comprising: code for causing a user equipment (UE) to receive, an uplink (UL) scheduling grant indicating subband precoding information and a resource allocation spanning a plurality of subbands, wherein the subband precoding information includes subband phase difference information; code for causing the UE to determine a plurality of subband precoders based on the subband phase difference information, each precoder of the plurality of subband precoders being associated with a subband of the plurality of subbands; and code for causing the UE to transmit to the BS, an UL communication signal in the resource allocation using the plurality of subband precoders.

22. The non-transitory computer-readable medium of claim 21, wherein the subband phase difference information includes a first subband phase difference indication, the program code comprising further comprising: code for causing the UE to receive a first value indicating a number of subband phase differences in a set of subband phase difference values; code for causing the UE to receive a second value associated with a phase increment across adjacent subband phase difference values in the set of subband phase difference values; code for causing the UE to select a subband phase difference from the set of subband phase difference values based on the first subband phase difference indication; and code for causing the UE to determine one or more subband phase coefficients for one or more subband precoders of the plurality of subband precoders based on the selected subband phase difference.

23. The non-transitory computer-readable medium of claim 21, wherein the UL scheduling grant further indicates a beam group offset, the program code comprising further comprising: code for causing the UE to select a number of adjacent beams based on the beam group offset; code for causing the UE to determine a beam cycling pattern having the number of adjacent beams, the determining a beam cycling pattern being based on the beam group offset and a first beam of the number of adjacent beams; and code for causing the UE to apply a subband precoder of the plurality of subband precoders and a beam from the beam cycling pattern for each subband of the plurality of subbands.

24. The non-transitory computer-readable medium of claim 21, the program code comprising further comprising: code for causing the UE to, for each time period, transmit a number of UL transmissions in physical UL shared channel (PUSCH) using a number of subband precoders of the plurality of subband precoders based on a beam pattern having a sequence of adjacent beams.

25. An apparatus, comprising: means for receiving from a base station (BS), an uplink (UL) scheduling grant indicating subband precoding information and a resource allocation spanning a plurality of subbands, wherein the subband precoding information includes subband phase difference information;
 means for determining a plurality of subband precoders based on the subband phase difference information, each precoder of the plurality of subband precoders being associated with a subband of the plurality of subbands; and
 means for transmitting to the BS, an UL communication signal in the resource allocation using the plurality of subband precoders.

26. A method of wireless communication, comprising: transmitting, by a base station (BS) to a user equipment (UE), an uplink (UL) scheduling grant indicating subband precoding information and a resource allocation spanning a plurality of subbands, the subband precoding information indicating a plurality of subband precoders and subband phase difference information, and each precoder of the plurality of subband precoders being associated with a subband of the plurality of subbands; and
 receiving, by the BS from the UE, an UL communication signal in the resource allocation based on a plurality of subband precoders.

27. The method of claim 26, wherein the subband phase difference information includes a first subband phase difference indication indicating a subband phase difference from a set of subband phase difference values.

28. The method of claim 27, comprising: transmitting, by the BS to the UE, a first value indicating a number of subband phase differences in the set of subband phase difference values; and transmitting, by the BS to the UE, a second value associated with a phase increment across adjacent subband phase difference values in the set of subband phase difference values.

29. The method of claim 28, wherein the transmitting a first value includes transmitting the first value via radio resource control (RRC) signaling.

30. The method of claim 28, wherein the transmitting a second value includes transmitting second first value via RRC signaling.

31. The method of claim 28, wherein the second value is inversely proportional to a control channel delay spread.

31

32

32. The method of claim 28, wherein the set of subband phase difference values includes a formula based on the first and second values, and the formula includes $$[0, \frac{\pi}{P}, \dots \frac{(M-1)\pi}{P}],$$

and wherein the first value is M, and the second value is P.

33. A non-transitory computer-readable medium having program code recorded thereon, the program code comprising:

code for causing a base station (BS) to transmit to a user equipment (UE), an uplink (UL) scheduling grant indicating subband precoding information and a resource allocation spanning a plurality of subbands, wherein the subband precoding information includes subband phase difference information; and code for causing the BS to receive from the UE, an uplink (UL) communication signal in the resource allocation based on a plurality of subband precoders.

34. The non-transitory computer-readable medium of claim 33, wherein the subband precoding phase difference information includes a first subband phase difference indication indicating a subband phase difference from a set of subband phase difference values.

35. The non-transitory computer-readable medium of claim 33, wherein the program code further comprises: code for causing the BS to transmit, to the UE, a first value indicating a number of subband phase differences in the set of subband phase difference values; and code for causing the BS to transmit, to the UE, a second value associated with a phase increment across adjacent subband phase difference values in the set of subband phase difference values.

\* \* \* \* \*